(12) United States Patent
Mital et al.

(10) Patent No.: US 9,183,653 B2
(45) Date of Patent: Nov. 10, 2015

(54) EXTENSIONS FOR MODIFYING A GRAPHICAL OBJECT TO DISPLAY DATA

(75) Inventors: Vijay Mital, Kirkland, WA (US); Darryl Ellis Rubin, Duvall, WA (US); Suraj T. Poozhiyil, Redmond, WA (US); Robert Anderson, Sammamish, WA (US); Olivier Colle, Bellevue, WA (US); John A. Payne, Seattle, WA (US); David G. Green, Redmond, WA (US); Jeremy William John Newton-Smith, Lake Forest Park, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 708 days.

(21) Appl. No.: 12/967,602

(22) Filed: Dec. 14, 2010

(65) Prior Publication Data

US 2012/0148088 A1    Jun. 14, 2012

(51) Int. Cl.
  *G06T 11/00* (2006.01)
  *G06T 11/60* (2006.01)
  *G06T 11/20* (2006.01)

(52) U.S. Cl.
  CPC ............... *G06T 11/60* (2013.01); *G06T 11/206* (2013.01)

(58) Field of Classification Search
  None
  See application file for complete search history.

(56) References Cited

U.S. PATENT DOCUMENTS

| 6,002,794 A * | 12/1999 | Bonneau et al. | 382/166 |
| 6,073,115 A * | 6/2000 | Marshall | 705/35 |
| 6,836,270 B2 * | 12/2004 | Du | 345/419 |
| 7,272,786 B1 | 9/2007 | McCullough | |
| 8,294,814 B2 * | 10/2012 | VanBree et al. | 348/373 |
| 2007/0185904 A1 | 8/2007 | Matsuzawa | |
| 2008/0172629 A1 * | 7/2008 | Tien et al. | 715/771 |
| 2011/0161874 A1 * | 6/2011 | Doughty et al. | 715/810 |

OTHER PUBLICATIONS

Moroney, Laurence; *Visualizing Information With .NET*; msdn; Aug. 2009; http://msdn.microsoft.com/en-us/magazine/ee294455.aspx.
Software FX, "*Data Visualization for Every Need, Every Plafform*"; Chart FX; *Tight Integration Into Visual Studio for Effortless Programmability and Superb End-User Experience*; Nov. 2, 2007; http://www.softwarefx.com/sfxNetProducts/ChartFX/features/default.aspx.
Bostock, Michael et al.; "Protovis: A Graphical Toolkit for Visualization"; Nov. 2009; http://vis.stanford.edu/protivis/protivis.pdf.

(Continued)

*Primary Examiner* — Andrew Yang
(74) *Attorney, Agent, or Firm* — Kevin Sullivan; Kate Drakos; Micky Minhas

(57) ABSTRACT

A graphical manipulation tool to create and/or make modifications to a graphical object suitable for visually representing data. The graphical manipulation tool analyzes the graphical object to determine parameters of visual characteristics of the graphical object that can be used to visually represent data. A computing system, through the graphical manipulation tool, may generate metadata that defines a capacity for visual characteristics to represent data. In some cases, a preview is displayed on a user interface indicating to a user how the metadata, if incorporated with the graphical object, may result in the visual characteristics of the graphical object being used to visually represent data. If incorporating the metadata with the graphical object is desirable, the user may provide to include the additional metadata with the graphical object.

20 Claims, 12 Drawing Sheets

(56) References Cited

OTHER PUBLICATIONS

Infragistics; "*Silverlight Data Visualization Controls*"; downloaded Sep. 22, 2010; http://www.infragistics.com/dotnet/netadvantage/silverlight /data-visualization.aspx #Overview.

"*VG Studio Max*"; downloaded Sep. 22, 2010; http://www.kallisto.net/VG-Studio-Max.html?lang=en.

"*Corel Visual Intelligence*"; downloaded Sep. 22, 2010; http://corel-visual-intelligence.software.informer.com/.

* cited by examiner

EXTENSIONS FOR MODIFYING A GRAPHICAL OBJECT TO DISPLAY DATA

BACKGROUND

People today are continuously exposed to large amounts of information, particularly in the form of quantitative data. It is often useful for such data to be presented in an intuitive manner. For example, a person tasked with the responsibility to give a presentation of a quantitative data set to others may find it useful to convey the information through a visual representation, such as a pie chart or bar/line graph. Thus, by presenting data using a visual representation, the data can be more easily explained than if merely numbers were presented.

It has become standard for users to operate computers having processors run with suitable software to gather, organize, manipulate and present data. Spreadsheets, for example, are commonly used to view and analyze large amounts of data. Portions of a data set contained within a spreadsheet may be selected in a manner to create a graphical representation of the data, such as in the form of a chart or graph. For example, data may be input from a spreadsheet into a line graph in a straight forward manner, so that trends along the function set forth by the line graph and determined by the data set can be easily visualized. Data plotted out by the line graph may also be manipulated, in turn, by altering features of the line graph and/or dimensions of the data set itself.

Creative artists have used available graphics tools to build up sophisticated and/or aesthetically pleasing graphical objects. Such graphical objects can be used or applied for display in a suitable computing environment.

SUMMARY

Aspects relate to using a graphical manipulation tool running on a computing device to define aspects of a graphical object for visually representing data. The graphical manipulation tool may include a software extension or plug-in that enables a visual artist to select and/or explicitly define how data may bind to visual characteristics of the graphical object for display of the data through the visual characteristics. The graphical object and associated visual characteristics may be analyzed to determine one or more parameters of the visual characteristics that can be varied to visually represent data with the graphical object. Metadata may be stored in association with a representation of the graphical object where the metadata represents a capacity of the visual characteristic(s) to represent data. After analyzing the graphical object and the current metadata associated with the graphical object, the software extension or plug-in of the graphical manipulation tool may generate additional metadata for potential incorporation with the graphical object representing an additional capacity of the visual characteristic(s) to visually represent data. Having generated the additional metadata, the system may receive input through a user interface for suitably incorporating the additional metadata.

The graphical manipulation tool may be used by the visual artist to create any arbitrary graphical object and/or form features in the graphical object. Once the graphical object has been analyzed to determine parameters of the visual characteristics of the graphical object that are suitable for visually representing data, additional metadata generated through the graphical manipulation tool defining an additional capacity for visual characteristics of the graphical object to represent data may be proposed to a user. Such a proposal may be through a display preview on a user interface indicating what aspects of the visual characteristics may change when used to represent data in accordance with the additional metadata. A user may view the preview on a suitable display to understand how the additional metadata modifies visual characteristics of the graphical object when visually representing data. The user may also, if desired, provide input through the user interface for incorporating the additional metadata with the graphical object to make the graphical object more suitable for visual data display.

The foregoing is a non-limiting summary of the invention, which is defined by the attached claims.

BRIEF DESCRIPTION OF DRAWINGS

The accompanying drawings are not intended to be drawn to scale. In the drawings, each identical or nearly identical component that is illustrated in various figures is represented by a like numeral. For purposes of clarity, not every component may be labeled in every drawing. In the drawings.

DETAILED DESCRIPTION

Figure 1:
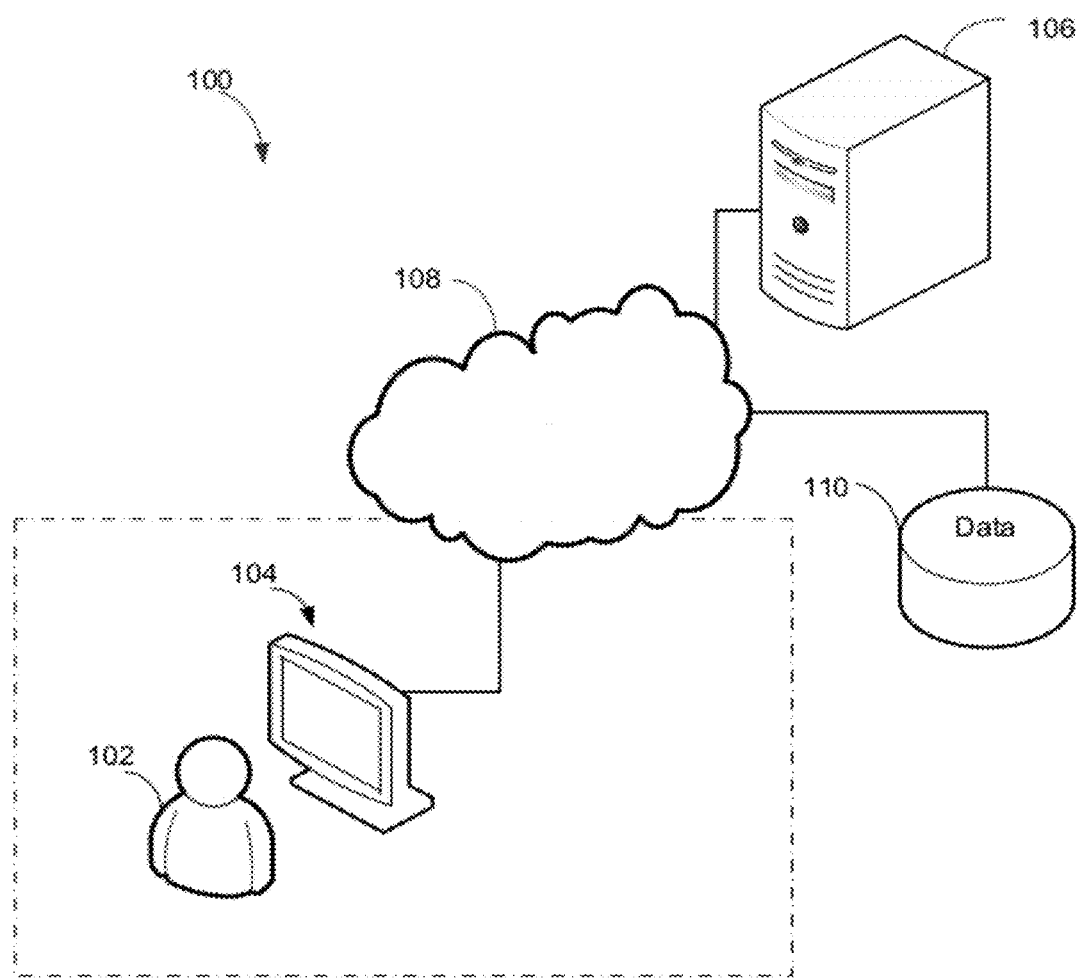
FIG. 1 is a high-level block diagram illustrating a computing environment in which some embodiments may be practiced.

The inventors have recognized and appreciated the value of incorporating within graphical manipulation tools the ability for users to be able to process a graphical object to make and/or modify aspects of the graphical object to be more suitable for data visualization. This processing of the graphical object may be independent of the data to be represented with the graphical object. In some embodiments metadata indicating capabilities of the graphical object to represent data may be generated by such a tool. One or more functionalities may be included with a graphical manipulation tool, for example, as a plug-in, extension, or a built-in feature of the software package for the graphical manipulation tool.

A graphical object may be created through any suitable graphical manipulation tool where visual characteristics of the graphical object may have the capacity to visually represent data. In an example of a graphical object suitable for displaying data, a dumbbell may have visual characteristics such as a bar and weights located on opposite sides of the bar. The size of the weights of the dumbbell, for example, may increase when the range of data represented by the weights of the dumbbell is broadened. Or, the distance the weights are separated from each other, based on the length of the bar, may depend on a certain type of data associated with separating different categories of other data.

Processing a graphical object may include analyzing the graphical object to determine parameters of visual characteristics of the graphical object that can be varied for data to be visually represented through the graphical object. In the example of a dumbbell graphical object, the weights on either side of the bar may have parameters that dictate a certain shape or size for the weights, for example, based on an aesthetic constraint. However, the shape and size of the weights can also be varied in accordance with values of data that may be graphically represented by the dumbbell. Associated with the graphical object may be metadata that provides information as to the capacity for the visual characteristic(s) to represent the data. For example, metadata associated with a graphical dumbbell may provide information on limitations of the size or shape of the weights pertaining to the ability for the weights to display data. Or, the metadata may include new information regarding the type or color of weights available for the graphical dumbbell to vary as a way to display data.

In further processing of the graphical object, a computing device may generate, through the graphical manipulation tool, additional metadata that provides further capacity for the visual characteristic(s) to represent data. In a graphical dumbbell, for example, the additional metadata may contain information regarding how the weights can be repeated, providing the graphical object with an ability to represent multiple similar data structures simultaneously. Alternatively, or in addition, the additional metadata may contain information regarding how weights can be fractioned into segments, where visual characteristics of the graphical object may suitably represent data structures conducive to sub-division. A preview of the result(s) of modifying the graphical object with the additional metadata may be presented on a visual display, showing to a user how the visual characteristic(s) in the graphical object are modified for representing data. For example, a user interface may present the preview as an explanation of what types of data the graphical object would be capable of representing if the proposed modification of the graphical object were implemented. The user interface may also permit a user to enter input into the computing device for the graphical manipulation tool to include the additional metadata with the graphical object, for example, by storing the additional metadata in memory in connected association with the graphical object.

A graphical object may represent portions of a data set by mapping a dimension of the data set to visual characteristics in a manner where values in that dimension of the data set may alter the appearance of the visual characteristics. Accordingly, such a mapping of dimensions of data to visual characteristics of a graphical object may alter the appearance of the visual characteristics based on parameters of the relationship formed between the visual characteristic(s) and the dimension(s) of data. Graphical manipulation tools may also provide users with the ability to assign and/or define relevant data visualization properties to a graphical object that make visual characteristics or elements of the graphical object suitable for data to bind to the graphical object. In some embodiments, binding data to the graphical object involves representing the data through an animation associated with the graphical object.

Through a traditional approach, a data set may be entered into a spreadsheet and displayed through a line graph. In some instances, a line graph may be insufficient to effectively represent other more complex sets of data. Further, the system may be limited in its ability to provide the line graph with an added pattern or property that enables the graph to more suitably represent the data. However, aspects described herein provide for the ability not only to use any arbitrary visual object as a foundation for which aspects of a data set may be imported into visual characteristics of the graphical object for suitable visualization of the data, but also to tailor graphical objects to enable visual representation of certain types of data structures. As such, visualizing data through separately created graphical objects independent from the data itself may provide for more interesting presentation of the data while not being limited to conventional approaches.

In an example, it may be desirable for data relating to sales in the past year of a company to be suitably displayed. This data may have multiple dimensions such as sales per quarter and sales events. Sales information for each quarter could be displayed, for example, through a conventional bar graph that depicts the amount of sales at the end of each quarter. The occurrence of the sales events also could be presented through a conventional graph. However, such a presentation of the data, using separate graphs, may be cumbersome for a user or not visually interesting. As a solution, it may be beneficial for both sets of data to be presented simultaneously together, as one visual object that may have interesting visual characteristics or multiple characteristics that can be varied to represent values of the data in multiple dimensions. Indeed, embodiments presented herein provide for the ability, using a graphical manipulation tool, to modify a graphical object to visually present data in an intuitive manner using visual characteristics that enable dimensions of data to be presented through the graphical object.

Data may be presented through an appropriate graphical object based on the capacity for the graphical object to represent the data. Such capacity may be determined by a number and type of visual characteristics of the graphical object with associated parameters that can be varied to represent the data. A data set may be represented by such a graphical object if each dimension of the data to be displayed can be matched to a parameter of a suitable type. For example, some dimensions of a data set may take on values that are continuous. A percentage increase in sales, for example, may take on any numeric value. To visually represent a percentage of sales increases, that dimension of the data set may be mapped to a visual characteristic that has a parameter that may have a value that may similarly be varied continuously, though possibly subject to constraints such as constraints on a maximum or minimum value. For example, a length of an object or density of shading are examples of visual characteristics that may be varied continuously. Other dimensions of data may exhibit other types of structure, such as data represented by a set of enumerable values, being a range of values, etc. Visual characteristics that are of matching types may be selected to represent such dimensions.

To define how data may visually map to visual characteristics of a graphical object, metadata may be stored in association with the graphical object and may be appropriately modified according to aspects presented herein so that appropriate data structures may be suitably displayed through the visual characteristic(s) of the graphical object.

Metadata pertaining to the ability for data to be bound to visual characteristics may be determined in any suitable way. In some embodiments, parameters of data visualization for a graphical object may be inferred by an analysis of the visual characteristics of the graphical object. A graphical object may have visual characteristics (e.g., shape) that includes parameters (e.g., length of the boundary of the shape) which may or may not be applicable to certain types of data. In some embodiments, a developer or creator of a graphical object may explicitly define parameters of certain visual characteristics of the graphical object through which certain types of data may be displayed. In some embodiments, a graphical manipulation tool may generate and propose parameters through which visual characteristics of the graphical object may display data.

Analyzing a graphical object and generating parameters for visual characteristics of the graphical object to represent data may be performed automatically with minimal user intervention or manually where a user provides, through an input, a set of commands that define the parameters for which the graphical object may display data. Alternatively, a graphical manipulation tool may automatically analyze, generate and/or propose parameters for the visual characteristic(s) to represent data and receive a manual input to create and store metadata that define such parameters in association with the graphical object. In an example, automatic initiation of analysis of aspects of the graphical object may occur periodically as a background process while a user is operating a graphical manipulation tool to create the graphical object. In some cases, the graphical manipulation tool may perform periodic analyses at a particular frequency according to a software setting.

Manual initiation of a graphical object analysis may occur upon the system receiving a user input. For example, a user interface may have a suitable actuating element (e.g., a button or hot spot) that enables a user to manually initiate analysis of a graphical object and generate a subsequent proposal for modifying the graphical object to incorporate one or more properties for rendering a visualization of data. In some embodiments, upon creation of a graphical object through a graphical manipulation tool, a prompt automatically appears on a display of a user interface requesting input as to whether an analysis of the graphical object will be initiated. If that analysis is initiated, the graphical manipulation tool may generate suitable metadata and display a proposal for including the metadata with the graphical object. The graphical object may be completed when formed, analyzed for potential data visualization, and modified to make more suitable for visually representing data.

In some embodiments, a system for presenting a display of data has access to a data set and a graphical object. The system analyzes the graphical object and the data set to determine whether visual characteristics of the graphical object are compatible with dimensions of the data set. If so, mapping of dimensions in the data set to the visual characteristics may result in a visualization of the data through the graphical object. In cases where multiple graphical objects are available, the system may propose to a user one or more of the graphical objects which have characteristics that are suitable for representing each dimension of the data set that the user has indicated are to be displayed. The user may then select a suitable graphical object on to which the data set is to be mapped and the system may subsequently generate a visualization of the data. Once a graphical object is presented (e.g., on a display of a user interface) where dimensions of a data set are bound to visual characteristics of a corresponding graphical object, a user may interact with portions of the graphical object and/or the data set through a graphical interface and provide modifications to the data visual dynamically.

Alternatively, a single graphical object may be available, yet a number of different modifications may be made to the graphical object for representing data differently. Accordingly, the system may propose each of the different modifications that may be applied to the graphical object (e.g., by adding different types of metadata) for viewing data differently and the user may select which modification to be employed with the graphical object.

Embodiments described herein provide an ability for dimensions of data to be mapped to arbitrary graphical objects where the dimensions of data are suitably represented. Any suitable graphical manipulation tool (e.g., MICROSOFT EXPRESSION® Studio, MAXON Cinema 4D) may be used to create graphical objects. As discussed above, graphical objects may include information (e.g., metadata) that sets forth the parameters through which dimensions of data may be bound to the graphical objects (i.e., to visual characteristics). In an embodiment, a software tool analyzes a graphical object and produces metadata that describes the extent to which data may be bound to various visual characteristics of the graphical object. In another embodiment, as part of creating the graphical object, a user expressly defines parameters (e.g., described by metadata) of visual characteristics in the graphical object that certain types of data may be mapped to. A software plug-in may be available for the user to provide input to a user interface for a system to define the parameters of the graphical object for representing the data. Such input may be provided during the process of creating the graphical object and/or after the graphical object is created where parameters for representing data may be defined. In some embodiments, a software tool analyzes a data set, which may or may not have appropriate metadata to determine a number and type of dimensions that could be displayed, and determines one or more graphical objects that would be suitable for representing the data set. Such a tool may receive user input selecting dimensions of a data set to be displayed.

The analysis may be performed in accordance with heuristics or other suitable criteria. For example the system may analyze one or more visual characteristics of a graphical object to determine whether the visual characteristic(s) has, or could have, a regular pattern for displaying a representation of data. In one example, a regular pattern may involve repetition where a visual characteristic or a portion of a visual characteristic (e.g., an element of the visual characteristic such as a beveled surface on a weight of a graphical dumbbell) may be repeated a number of times for representing data. The pattern of repetition may be represented as one or more layouts of arrangements of the repeated elements of the visual characteristic. For instance, a beveled surface may be repeated a number of times to produce an arrangement on a weight of a graphical dumbbell suitable for representing data through the repeated beveled surface. Or, sprinkles on a graphical donut may be repeated a suitable number of times according to a layout having an arrangement where each repeated sprinkle represents data in a data set (e.g., sales events occurring over the course of a year). In another example, a regular pattern may involve sub-division of a visual characteristic or a portion of a visual characteristic (e.g., an element of the visual characteristic such as potential segments of a graphical donut) into segments for visually representing data. The pattern of sub-division may be represented as one or more layouts of arrangements of the sub-divided element of the visual characteristic. In a graphical donut, for example, the dough may be sub-divided any number of times to produce a layout having an arrangement where each sub-divided segment (or further sub-divisions thereof) may be used to represent data in a data set (e.g., sales data for each day of a month). Once the system determines the ability for a visual characteristic of a graphical object to take on certain patterned properties that the tool has been programmed to recognize as existing in a data set to be displayed, a proposal may be presented through the appropriate graphical manipulation tool on a user interface. Upon incorporating the patterned properties, the graphical object may display a suitable data set by binding to visual characteristic(s) in accordance with the updated properties.

Analysis of a graphical object may involve determining what geometric dimensions in the graphical object, such as the height or width of an element (e.g., sphere, bar, etc.) of a visual characteristic, may be suitable for data visualization. When binding data to one or more visual characteristics of a graphical object, certain constraints may be specified, such as maintaining a boundary or an aspect ratio of a particular feature of a visual characteristic, or limiting one dimension (e.g., height) to be no more than a certain amount of times another dimension (e.g., 5 times the width). Dimensions of a visual characteristic may correspond with a certain coordinate system, such as cartesian, spherical and/or cylindrical. For example, a visual characteristic may be subject to a constraint where rotation around a defined point is specified by an arc that spans a particular angle.

In an example described further below of a graphical donut, one constraint may include the angle spanned by an arc defining the size of a partitioned segment within a graphical donut. By setting each segment of a graphical donut to represent the amount of sales during a given month, the angle spanned by the arc of each segment may be limited so that the graphical donut is sub-divided into twelve different segments. As such, a constraint applied to a graphical donut may include angles of segments forming the donut required to collectively total 360 degrees. Though, for a sliced donut, segments forming the donut might not total 360 degrees. In some embodiments, some visual characteristics having certain dimensions are not used to represent data. For example, a hole of a graphical donut might not be suited to represent data. Further, the size of a hole in a graphical donut may be altered subject to general scaling of the visual characteristic in relation to other geometrical features of the graphical object.

Other properties of visual characteristics of a graphical object may also be analyzed for their potential to visually represent data. Some properties include the color and/or texture of visual characteristics. For example, colors and/or textures can be used as identifiers within a visual characteristic for certain categories of data. Alternatively or in addition, color shadings (e.g., darker, lighter) or degree of texture (e.g., smoother, rougher) may be indicative of degrees of variation in a data set. Lighting properties, such as glows, luminescence, color intensity, shadows and spotlights, may also be incorporated within visual characteristics of a graphical object for representing data. Any suitable feature(s) of a visual characteristic may be proposed as suggestion(s) on a user interface for the graphical object to be suitably modified (e.g., addition of metadata) to make more suitable for visually representing data. A user may also provide input through an interface indicating one or more of these properties, such as color position, height, constraints, color, separation, etc. to be indicated as a parameter for binding data to a visual characteristic.

An analysis of a graphical object may reveal a series of independent elements of a visual characteristic that may be repeatable for visually representing data. For example, pins on a map may be repeatable as features for building a more complex visual object for representing various dimensions of a data set. Constraints may also be set indicating how few or how many times certain elements can be repeated on a graphical object. The graphical object may include metadata that defines the capacity for the visual characteristic(s) to visually represent data. For example, the metadata may indicate a maximum number of repetitions and/or sub-divisions of the element(s) of the visual characteristic(s) in the graphical object for data display.

In some embodiments, a computing device analyzes the graphical object through an extension of the graphical manipulation tool to identify actual or potential hierarchical features of visual characteristics that may be relevant to data visualization. For example, a visual characteristic may include an element that is able to contain or envelop portions of another element of the visual characteristic, such as through a nested arrangement. Or, a visual characteristic may involve layering of portions of the visual characteristic that may be amenable to visually representing certain data structures. Upon an appropriate analysis, such features may be proposed as suggestion(s) on a user interface for the graphical object to be suitably modified (e.g., addition of metadata). The system may receive input incorporating the ability for one or more of these features to be suitably bound to data.

In certain embodiments, a computing device analyzes the graphical object through an extension of the graphical manipulation tool to identify visual characteristics that have, or could have, a feature amenable to animation where the animation provides a visual representation of data. An animation may be suitable for representing a particular series of data, for example, data that changes over time. A suitable animation may include a visual characteristic subject to translation, rotation, progressive revelation of a particular pattern or series, etc. In some cases, certain visual characteristic may have intrinsic features that are conducive to animation, such as a graphical head that nods with a certain frequency, or the depth that a graphical bow may be pulled back, which are features suitable for representing dimensions of a data structure. Or, a visual characteristic may provide a series of frames for an animation, indicating different properties for some value(s) of data over time. One or more appropriate animations may be proposed as suggestion(s) for modification of a visual characteristic of a graphical object, such as through inclusion of additional metadata. In some cases, a user may provide input through a user interface for modifying the graphical object to support animation(s) that provide for suitable binding to data.

Any suitable set of heuristics may be used through a graphical manipulation tool in analyzing and proposing modifications to a graphical object whether already created or in the process of being created. In some embodiments, statistical pattern matching techniques may be used to determine properties or potential properties of one or more visual characteristics that could be used for visualizing data through the graphical object. The process of modifying a graphical object to make suitable for representing data may include an interactive display that permits a user to observe and directly make changes to metadata characterizing the behavior of the visual characteristic(s) used to visually represent data. For example, a user interface may include one or more software-generated windows for a user to provide input, such as by typing or clicking on an expression for implementing modifications represented by the expression with the graphical object.

In some embodiments, a computing device running a suitable graphical manipulation tool may group certain implementations of modified graphical object(s) as a feedback mechanism for determining the usefulness of each implementation. For example, the likelihood that a particular modification of a graphical object will be proposed may depend on how previously similar modifications of graphical objects fared. That is, if it is determined that a certain type of modification of a graphical object is generally useful for visually representing data, then there is a high likelihood that the system running the graphical manipulation tool will propose a similar suggested modification for another graphical object. Or, vice versa, where the system will be likely not to propose a certain type of modification to a graphical object if that type of modification has generally been determined not to be useful. Degree of "usefulness" may determined in any suitable manner, such as by assigning values to specific types of modifications based on user feedback, or for example, tracking usage frequency of certain types of modifications where the more frequently used types of modifications will be proposed more often than modifications that are less frequently used. In this respect, the system includes an "intelligent memory" that informs how the system will propose modifications of graphical objects for visually representing data.

For some embodiments, proposing a suggestion as to a potential modification of a graphical object includes presenting a preview on a display of a user interface indicating how a visual characteristic of the modified graphical object would represent data, if implemented to represent data. In some embodiments, a proposal may include a suggestion that provides an aesthetic fix to a visual characteristic that makes the graphical object more suitable for data visualization. For example, certain aspects of visual characteristics may be amenable to aesthetic modification, such as lighting, focus, depth, distance between or around elements, etc.

FIG. 1 is a high level diagram illustrating a computing environment 100 in which some embodiments of the invention may be practiced. Computing environment 100 includes a user 102 interacting with a computing device 104. Computing device 104 may be any suitable computing device, such as a desktop computer, a laptop computer, a mobile phone, or a PDA. Computing device 104 may operate under any suitable computing architecture, and include any suitable operating system, such as variants of the WINDOWS® Operating System developed by MICROSOFT® Corporation.

Computing device 104 may have the capability to communicate over any suitable wired or wireless communications medium to a server 106. The communication between computing device 104 and server 106 may be over computer network(s) 108, which may be any suitable number or type of telecommunications networks, such as the Internet, a corporate intranet, or cellular networks. Server 106 may be implemented using any suitable computing architecture, and may configured with any suitable operating system, such as variants of the WINDOWS® Operating System developed by MICROSOFT® Corporation. Moreover, while server 106 is illustrated in FIG. 1 as being a single computer, it may be any suitable number of computers configured to operate as a coherent system. Computing device 104 may also have access to any suitable source of data 110 through a direct connection and/or over a network 108.

In the embodiment of FIG. 1, a data analysis system may execute on server 106, and computer 104 may provide a user interface through which a user 102 may enter inputs and receive results. However, there is no requirement that the data analysis system execute on a server and it may, for example, execute wholly on computer 104.

Regardless of the type of input provided by user 102 that triggers generation of an input, computing device 104 may send the input to server 106 to obtain information relevant to the input. That information may be obtained from one or more data sets stored in database 110 which is accessible directly and/or over network 108. Information may be displayed on a display of computing device 104. A display may be any suitable display, including an LCD or CRT display, and may be either internal or external to computing device 104.

Figure 2:
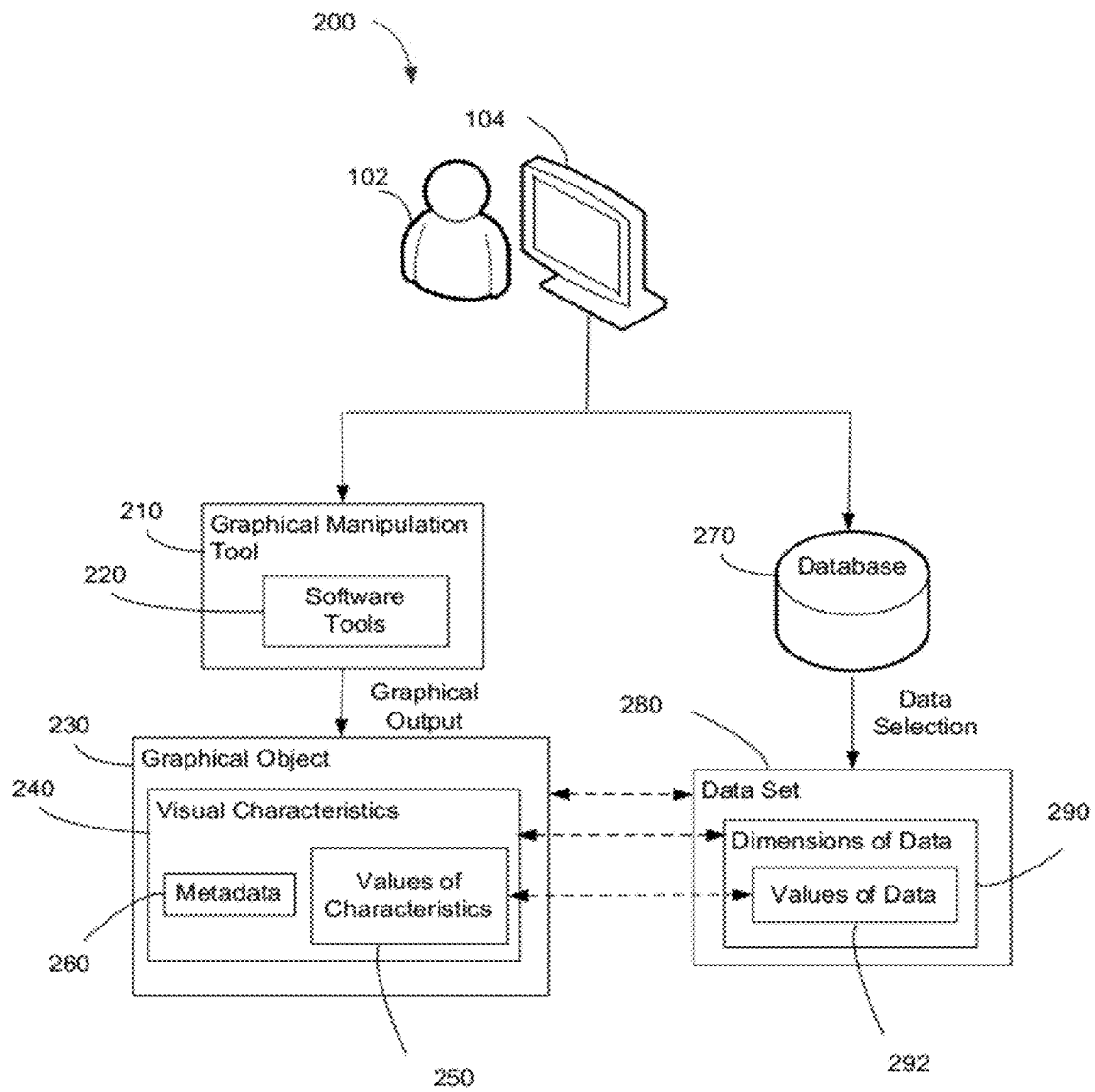
FIG. 2 is a block diagram of a system in accordance with some embodiments.

As shown in FIG. 2, embodiments of the system 200 may include a user 102 on a workstation 104 having access to a graphical manipulation tool 210 and a database 270. The graphical manipulation tool 210 incorporates a number of software tools 220. A user 102 may employ the graphical manipulation tool 210 to create a graphical output, resulting in a graphical object 230. A user 102 may also use graphical manipulation tool 210 to modify an existing graphical object. The graphical object 230 includes visual characteristics 240 having values 250 that define the visual characteristics for display in accordance with any suitable software environment. The graphical object may also include metadata 260 that contains information related to aspects of the visual characteristics and/or values, for example, relating to how one or more of the visual characteristics may represent data.

The system 200 may also include a database 270 where a user may select a data set 280 from the database. The data set 280 includes dimensions of data 290 which, in turn, include values of data 292. In embodiments described herein, a suitable mapping of the data set 280 with the graphical object 230 may occur. For example, dimensions of data 290 of the data set 280 may map to suitable visual characteristics 240 of the graphical object 230. Similarly, values of data 250 within the dimensions of data 290 may map to corresponding values 250 of visual characteristics 240, in accordance with parameters set forth by the metadata 260. It should be appreciated that a graphical manipulation tool 210 and a database 270 may be stored and/or accessed on the same or separate computing devices.

Figure 3:
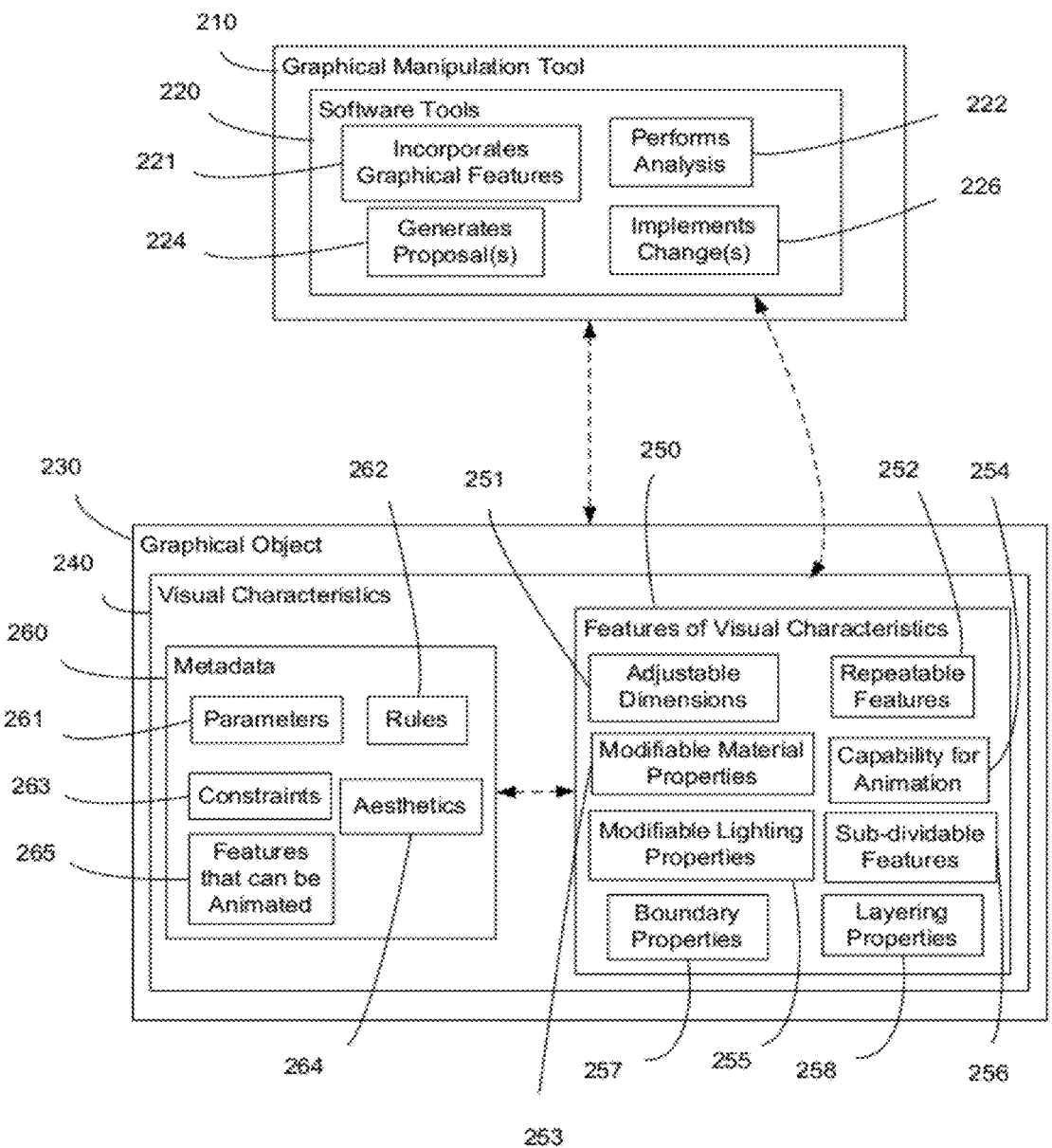
FIG. 3 is a block diagram of an interaction between a graphical manipulation tool and a graphical object in accordance with some embodiments.

FIG. 3 provides a more detailed system view of graphical manipulation tool 210 having software tools 220 that perform various functions upon receiving an appropriate input for creating and/or modifying a graphical object 230. An example of a software tool is one that manipulates a graphical object 230 by incorporating graphical features 221 into the graphical object 230, such as by permitting certain features to be drawn, imported and/or placed within the graphical object. Another software tool may involve performing an analysis 222 on a graphical object 230 to determine what parameters of visual characteristics either existing or potentially added, of the graphical object 230, may be suitable for visually representing data. Based on such an analysis, yet another software tool may generate one or more proposals 224 of how a graphical object 230 may be modified to be more suitable to visually represent data. For example, from the results of a suitable analysis, the software tool may generate metadata that defines how the visual characteristic(s) may be modified to represent data, and the effect of including the metadata with the graphical object may be previewed as a proposal. A further software tool may receive input to implement one or more changes 226 to the graphical object 230 so as to better enable data to visually bind to the graphical object 230.

Graphical object 230 may include a number of visual characteristics 240 that may or may not be suitable for binding to data. Examples of features of visual characteristics 250 of the graphical object that may be useful for visually representing data may include adjustable dimensions 251, repeatable features 252, modifiable material properties 253, capability for animation 254, modifiable lighting properties 255, sub-dividable features 256, boundary properties 257 and layering properties 258. It can be appreciated that other features of visual characteristics 250 may also be useful for visually representing data. The graphical object may include metadata 260 which defines how data may bind to certain features of visual characteristics for displaying the data. Such metadata 260 may include certain parameters 261, rules 262, constraints 263, aesthetics 264 and definitions of animations 265 which govern the ability for visual characteristics of the graphical object to display data. Aspects of visual characteristics and metadata may be interrelated. For example, a constraint on a repeatable feature and an adjustable dimension may be subject to an aesthetic rule where certain features can only be repeated a certain number of times or enlarged a certain amount so as not to be larger than or encroach upon another feature of the graphical object. Thus, the graphical manipulation tool 210 can be used to analyze the graphical object, generate additional metadata and present a proposal based on the additional metadata for how the graphical object can be modified to more suitably represent data, and implement one or more changes in the graphical object (e.g., adding the metadata to the graphical object) so that the graphical object is able to more suitably represent data.

Figure 4:
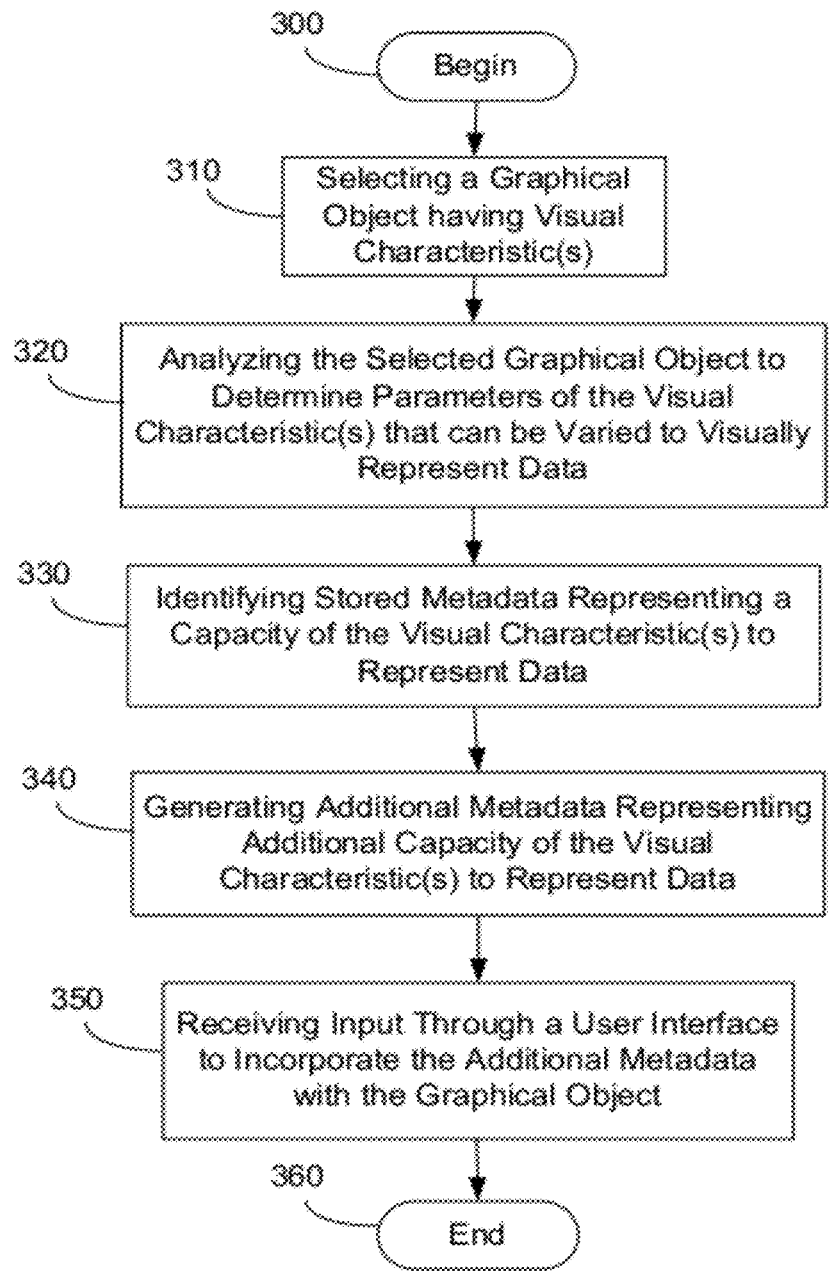
FIG. 4 is a flow chart of a method of processing a graphical object according to some embodiments in a format that aids a user to visualize the data.

FIG. 4 depicts a flow chart for using a graphical manipulation tool to propose and implement modifications in a graphical object for displaying data. Upon beginning 300, in step 310, a graphical object having a number of visual characteristics is selected. In step 320, the selected graphical object is analyzed by the system to determine parameters of the visual characteristics that may be suitably varied to better visually represent data. In step 330, stored metadata representing the capacity of the visual characteristics to represent data is identified through the analysis of step 320. The system generates additional metadata in step 340 representing an additional capacity of the visual characteristics to represent data. In some cases, a preview of how the additional metadata may alter the graphical object before and/or after data is bound to the graphical object may be presented. In step 350, the system then receives an input through a user interface for incorporating the additional metadata with the graphical object. In some embodiments, a user determines that the proposed metadata is unsuitable for incorporating in the graphical object and provides input for the system to generate and propose a different set of additional metadata for the user to preview. In such a case, the user may step through a library of possible selections of additional metadata for potential incorporation with the graphical object. Once, the graphical object is suitably updated so as to visually display data, the process may be finished 360 and the graphical object, for example, may be saved or exported as desired.

Figure 5:
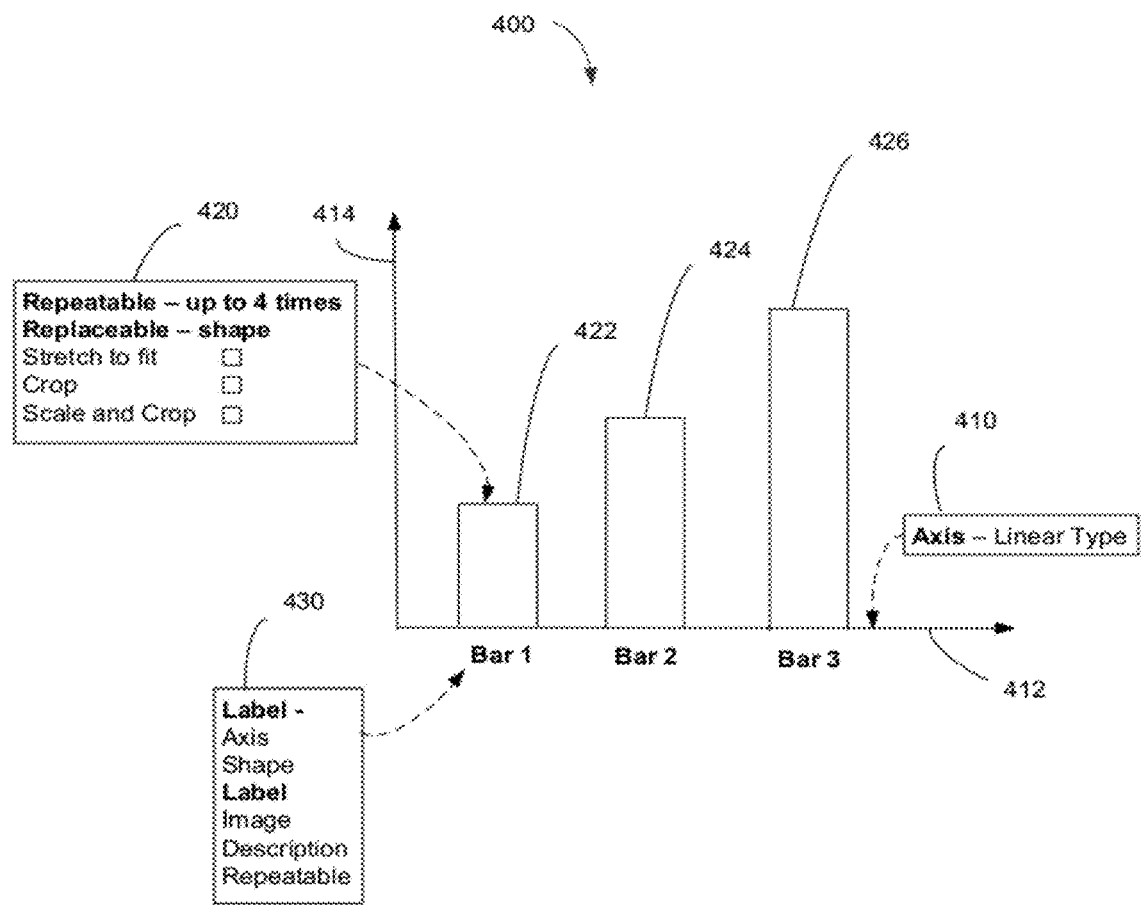
FIG. 5 is an illustrative example of a user interface through which a user is able to provide input for manipulating features of a graphical object.

FIG. 5 depicts a graphical object 400 having visual characteristics that may be manipulated according to certain parameters, which may be represented by metadata associated with the object. One visual characteristic involves the axes of the graphical object. An axis adjustment box 410 is used to set parameters of the axes, in this case, to be "Linear Type" axes. Such a value may indicate that the axis is suitable for representing data that varies in a regular pattern over a relatively finite range. If other types of axes can be specified, other options may appear. For example, if a logarithmic type were supported, that designation would provide a further indication of the types of data that could be supported. Though, in this example, horizontal axis 412 and vertical axis 414 are visual elements of the axis visual characteristic set to be linear in nature.

Another visual characteristic includes bars bound by the axes of the graphical object. A bar adjustment box 420 reveals parameters associated with the bars 422, 424, 426 of the graphical object. In this example, bar adjustment box 420 is set so that bars are repeatable up to 4 times and the shape of each bar is replaceable according to parameters defined by the checkboxes "Stretch to fit", "Crop" and "Scale and Crop." In mapping data to the object repeatability of the bars may be adjusted, for example, to be repeated 2 times. As shown, a bar is repeated twice, resulting in three bars displayed. If the "Stretch to fit" checkbox is marked, then the shape of each bar is capable of being stretched, through a suitable input, for example, to fit an aesthetic rule. The aesthetic rule may be that the bars are required to stretch horizontally so as to be evenly spaced along the horizontal axis 412. Marking the "Crop" checkbox involves each bar having the ability to be cropped according to a user input so as to provide a more detailed view of the data represented by the bar and within the cropped region. Marking the "Scale and Crop" checkbox involves the ability for each bar to be cropped in addition to scaling the more detailed view of the data represented within the cropped region so that the data is more easily viewable.

Label adjustment box 430 is also provided to indicate that various labels on the graphical object may be modified accordingly. In FIG. 5, the label adjustment box 430 is currently set to "Label," where current labels which are disposed along the horizontal axis 412 are adjustable based on a user input. Labels of other features may also be adjusted, provided by options given by the headings "Axis", "Shape", "Image", "Description" and "Repeatable." For example, if the heading "Axis" is selected, then labels for one of the axes (e.g., horizontal axis 412, vertical axis 414) may be adjusted so that a label corresponding to either the horizontal axis 412 or the vertical axis 414 may be set to recite features of what each bar represents.

After the graphical object is produced and modified to be amenable to visually representing data using an appropriate graphical manipulation tool, the graphical object may be selected for data to visually bind to the graphical object. FIGS. 6-12 now described, illustrate an example of a user interface of a data visualization system where a graphical object, having been modified according to the process described in FIG. 4 to incorporate additional metadata, is used to visually represent data. Within the user interface, a user has the ability to select a number of icons on the user interface. "Visual" icon 1010 permits the user to select from a number of graphical objects through which data may be displayed. "Data" icon 1020 allows the user to choose a data set to be displayed through the selected graphical object. The user interface also provides a canvas 2000 on which visualizations of data may be displayed.

The graphical donut, as described further below, has visual characteristics that are able to visually represent data. However, it can be appreciated that the graphical donut may have, at one point, included a minimal amount of metadata defining how visual characteristics may represent data. Indeed, prior to a suitable analysis and generation of additional metadata defining further capacity for the visual characteristics to represent data, the graphical donut may have simply been an image of a donut with icing and sprinkles without the ability to visually represent data. Accordingly, further processing of the graphical donut may have been performed to make visual characteristics such as the base, icing and sprinkles amenable for visually representing data. It can also be appreciated that the graphical donut, described below, may be subject to further analysis as to whether the graphical donut may incorporate even more metadata defining additional aspects of how the graphical donut may represent data (e.g., through an rotating and/or translating animation).

Figure 6:
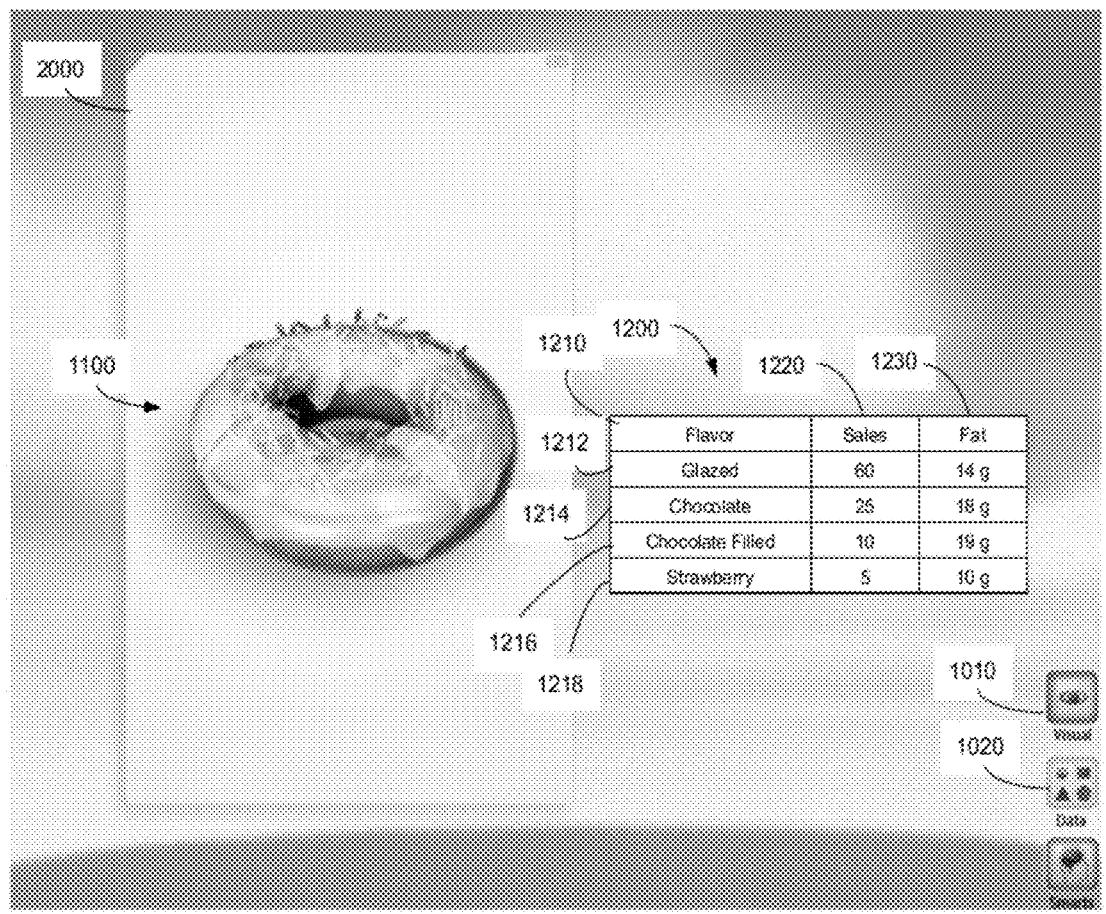
FIG. 6 is an illustration of a representative user interface where a graphical object is chosen and dimensions of a data set are presented.

FIG. 6 illustrates a chart 1200 that depicts dimensions of a data set, for example, sales data 1220 reported from a donut shop of different flavors of donut 1210, each flavor of donut having a fat content 1230. As such, a listing of flavors of donuts 1210 and the respective sales 1220 and fat content 1230 for each flavor of donut is provided. As shown in the example, 60 million in revenue was reported from sales of the glazed donut having 14 g of fat, 25 million in revenue was reported from sales of the chocolate donut having 18 g of fat, 10 million in revenue was reported from sales of the chocolate filled donut having 19 g of fat, and 5 million in revenue was reported from sales of the strawberry donut having 10 g of fat. In the representative embodiment, the user selects the chart 1200 and applies the mapping of the data from the chart 1200 to the graphical donut 1100. A method for making such a selection may involve, for example, the user manipulating a pointer to select the chart 1200 and dragging the data set over to the graphical donut 1100 for subsequent processing and visualization of data to occur by the system.

When the graphical donut 1100 was in the process of being created, the donut may have been analyzed by a software feature of the graphical manipulation tool as to whether certain features or elements of visual characteristics of the donut may be suitable for displaying data visually. Visual characteristics such as sprinkles or icing on the donut may have been determined to be useful for representing data and proposals as to how the visual characteristic(s) would display data would be presented. Based on an input, metadata defining aspects of the visual characteristic(s), such as icing or sprinkles, to which data may bind may be incorporated in the graphical object.

Figure 7:
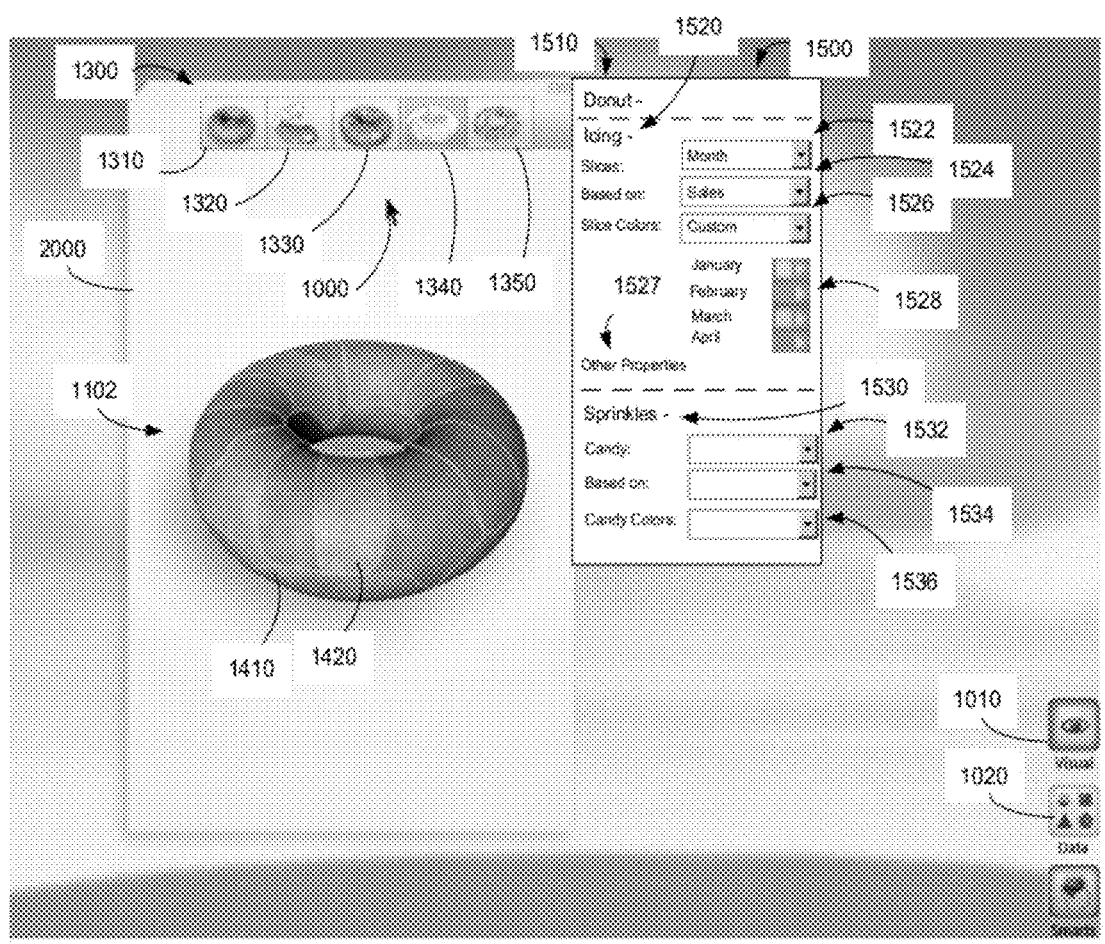
FIG. 7 is an illustration of a representative user interface where a type of visualization of the graphical object is specified.

In the embodiment, the user interface is built based on metadata associated with the graphical donut 1100. As shown in FIG. 7, a number of parameters that describe a visual mapping between the data of sales reported and the graphical donut 1100 is displayed. Accordingly, based on the metadata incorporated in the graphical donut 1100 (e.g., through a software plug-in of the graphical manipulation tool described above), a modified graphical donut 1102 having sales data incorporated into the donut is presented. Graphical donut 1102 includes the dough 1410 and colors of icing 1420 segmented into twelve different regions. Each of the twelve regions corresponds to sales reported for each month of the year where the area occupied by each segment of icing 1420 is indicative of the amount of sales reported for that month. For example, when the area of a first segment of icing corresponding to a first month is depicted to be greater than the area of a second segment of icing corresponding to a second month, the sales reported at the end of the first month is interpreted in the sales representation to be greater than the sales reported at the end of the second month. Or, in another example, the color of icing displayed on a graphical donut may indicate a certain amount of sales. For instance, chocolate icing displayed for one segment may be indicative of greater sales reported for one particular month as compared with strawberry icing displayed for another segment, indicating sales reported for a different month.

In some embodiments, a number of proposed data visuals, through the same graphical object, are made available for the user to select. The proposed graphical donuts for representing the data are different in appearance as well as the number and type of visual characteristics to which data can be mapped. Each of the proposed graphical donuts may have different sets of metadata indicating how each graphical donut may be used to visually represent data. Accordingly, graphical donut 1102 is only one proposed visual of how the data set may be displayed. Indeed, a collection 1300 of proposed visuals 1310, 1320, 1330, 1340, 1350, each tailored to represent data in a different way, are presented on the canvas 2000 for a user to choose. In the example shown in FIG. 7, graphical donut 1102 corresponds to selection of proposed visual 1340. As shown, the graphical box representing proposed visual 1340 is darkened and graphical donut 1102 is displayed on a main portion of canvas 2000.

In an embodiment, if proposed visual 1310 is selected, the graphical donut displayed in the center of the canvas 2000 would only include parameters associated with the dough of the donut; that is, dimensions of data would be presented on the donut with respect to the dough of the donut, without reference to other visual characteristics such as icing or sprinkles. In such a case, it may be desirable, for example, that sales data for an entire year be displayed, without a break down of variation within the year (e.g., by quarter, by sales event). In an example, the dough of the donut may take up a larger volume for greater amounts of sales reported, and conversely, the dough may be smaller in volume for a smaller amount of sales revenues reported. In some cases, proposed visual 1310 may have been created using a graphical manipulation tool that performed an analysis on the original graphical object, suggesting the modes in which the graphical object may represent data, and implementing those modes in the graphical object (e.g., through the addition of appropriate metadata).

For example, if proposed visual 1320 is selected, the graphical object displayed in the center of the canvas 2000 would include only portions of icing related to certain dimensions data that are to be presented, without showing the type of donut or sprinkles. For example, if it is desirable for sales data reported from only two quarters to be displayed, and not the entire year or sales from events during the year, then the icing graphic associated with only those two quarters will be presented. Similarly to that described above for proposed visual 1310, proposed visual 1320 may have been created via an analysis on the original graphical object where the graphical object is suitably modified to represent data.

Proposed visual 1330 enables data to be presented by all three major visual characteristics of the graphical donut; that is, the dough of the donut, icing and sprinkles together. In such a case, and without limitation, the dough of the donut may represent a total volume of sales reported at the end of a year, the icing may signify the amount of sales reported at the end of each quarter, and the sprinkles may indicate the occurrence of particular sales events that have contributed to overall sales. Proposed visual 1330 may have been created out of a modification of the original graphical object to incorporate such features of data display.

Proposed visual 1340, which refers to the graphical donut 1102 of FIG. 7, combines aspects of proposed visualizations 1310 and 1320, permitting data to be displayed by the dough of the donut and the icing, yet without sprinkles, in accordance with how the original graphical object was modified to be suitable for visually representing data. Accordingly, for example, total sales reported at the end of a year is presented by selecting the donut and sales reported at different points throughout the year (e.g., monthly, quarterly) is displayed by selecting certain types of icing to represent the break down of those reported sales.

Selecting proposed visual 1350, for example, would result in the graphical donut displayed on canvas 2000 to include data displayed by the dough of the donut and the sprinkles, yet without icing. In an example, data represented by the graphical donut would include annual sales reported, represented by the dough of the donut, and discrete sales events, represented by the sprinkles.

Indeed, proposed visuals may be selected as desired. For example, a proposed visual may be chosen according to whether how appealing or interesting the style of the visual appears. A proposed visual may also be selected based on its functionality, for example, the number of dimensions of data that can be displayed through the visual.

Also shown in FIG. 7, a graphical modification tool 1500 illustrates an embodiment of how various parameters of visual characteristics of the graphical donut 1102 may be adjusted. For example, "Donut" adjustment box 1510 may be manipulated by a user for the system to modify parameters of data visualization through the donut itself and/or the data that is represented by the donut. "Icing" adjustment box 1520 may permit a user to provide input for the system to modify parameters of how the icing of the graphical object is used to display data and/or the data itself represented by the icing. "Sprinkles" adjustment box 1530 may also provide a user with the ability to provide input for the system to adjust parameters relating to a mapping between the graphical sprinkles and the data presented by the sprinkles. Each graphical object may include a particular graphical modification tool where metadata defining how visual characteristics of the graphical object may visually represent data also defines how the graphical modification tool may be used to adjust what data is represented by the visual characteristics and in what manner. In some embodiments, a graphical modification tool may be used as a graphical manipulation tool for incorporating metadata into a generic graphical object. However, it can be appreciated that a graphical manipulation tool may be used independent from a data set.

As discussed previously, a user chooses the type of graphical object corresponding to particular dimensions of data for the system to render the data visual. In the representative embodiment, the user has selected a graphical donut to represent data regarding the revenue generated from donut sales reported over a year. While aspects of adjustment in the "Donut" adjustment box 1510 are not shown, the box 1510 may be opened to reveal features relating to how the graphical donut may be adjusted. For example, a different flavor donut may be selected to represent the data. Metadata generated by analysis of this donut graphical object may be used to render this interface. For example, analysis may have resulted in metadata indicating that the donut can be displayed to appear sliced or to have portions depicted in different colors. Likewise analysis may have revealed that visual characteristics associated with sprinkles may be varied based on data values. For example, data values may control the number or color of sprinkles.

Given that graphical donut 1102 is displayed through selection of proposed visual 1340, features of the icing 1420 may be readily adjusted through modification of parameters in regions provided by "Icing" adjustment box 1520. "Icing" adjustment box 1520 includes a "Slices" region 1522 that provides a user with the ability to provide input for the system to adjust what dimensions of data are represented by the segments of icing depicted in the graphical donut. A "Based on" region 1524 permits a user to provide input as to what type of data the icing generally represents. The "Slice Colors" region 1526 allows a user to determine what colors will represent certain slices of icing through the visual rendering. An "Other Properties" region 1527 is further provided where more options for adjusting parameters of the icing will appear upon selection of this region.

In the example shown, the "Slices" region 1522 is currently given a "Month" setting in the drop down box and the "Based on" region 1524 is set to a "Sales" setting. The "Month" and "Sales" settings result in the icing 1420 of the graphical donut 1102 representing sales data reported by the business at the end of each month. In some cases, the "Slices" region 1522 may be given a different setting, for example, an annual or quarterly setting. Similarly, the "Based on" region 1524 may also be set to a different parameter besides sales, for example, inventory or organizational structure. In an example, the "Based on" region 1524 may be set to reveal sales of a particular donut (e.g., glazed, chocolate, chocolate-filled or strawberry), rather than sales of all donuts, so that it can be determined which donuts are more or less popular.

The "Slice Colors" region 1526 follows according to settings determined by the "Slices" region 1522 and the "Based on" region 1524, denoting the colors of each slice to be "Custom" selected. Hence, color selection region 1528 is provided adjacent to the "Slice Colors" region 1526 for a user to select what colors in the graphical rendering will denote which segments in the graphical donut 1102 representing months of the year. In some cases, the "Slice Colors" region 1526 may be given a setting other than "Custom," for example, a "Default" setting where colors for each segment that represent months in the year may be automatically set to default colors determined by the system. Or, in another example, if the "Slices" region 1522 is set to an "Annual" setting (rather than by "Month"), then for sales data reported from the past few years, the color selection region 1528 may be reorganized so that selection of segments in the graphical donut 1102 represent past years as opposed to months.

Upon receiving user input for the above settings, the system retrieves the appropriate dimensions of data from the data set for mapping to the corresponding visual characteristic. Values of parameters that modify the appearance of each visual characteristic are set based on the values within each dimension. As a result, the graphical object is rendered according to the parameter values using known techniques for displaying objects with adjustable characteristics. In the example, for the icing visual characteristic, as the "Slices" region 1522 is set to "Month" and the "Based on" region 1524 is set to a "Sales," the system acquires a dimension of data from the data set having to do with sales revenues reported for each month. Values of parameters corresponding to features of the visual characteristic that give rise to appearance are then set to match up with values of the dimension of sales revenues for each month.

Continuing to refer to FIG. 7, currently selected proposed visualization 1340 does not provide for data to be represented by sprinkles, so no options are available for parameters within the "Sprinkles" adjustment box 1530 to be adjusted. Even so, various regions are still provided for viewing in the "Sprinkles" adjustment box 1530, including a "Candy" region 1532, a "Based on" region 1534, and a "Candy Colors" region 1536, explained in further detail below with respect to FIG. 8.

Figure 8:
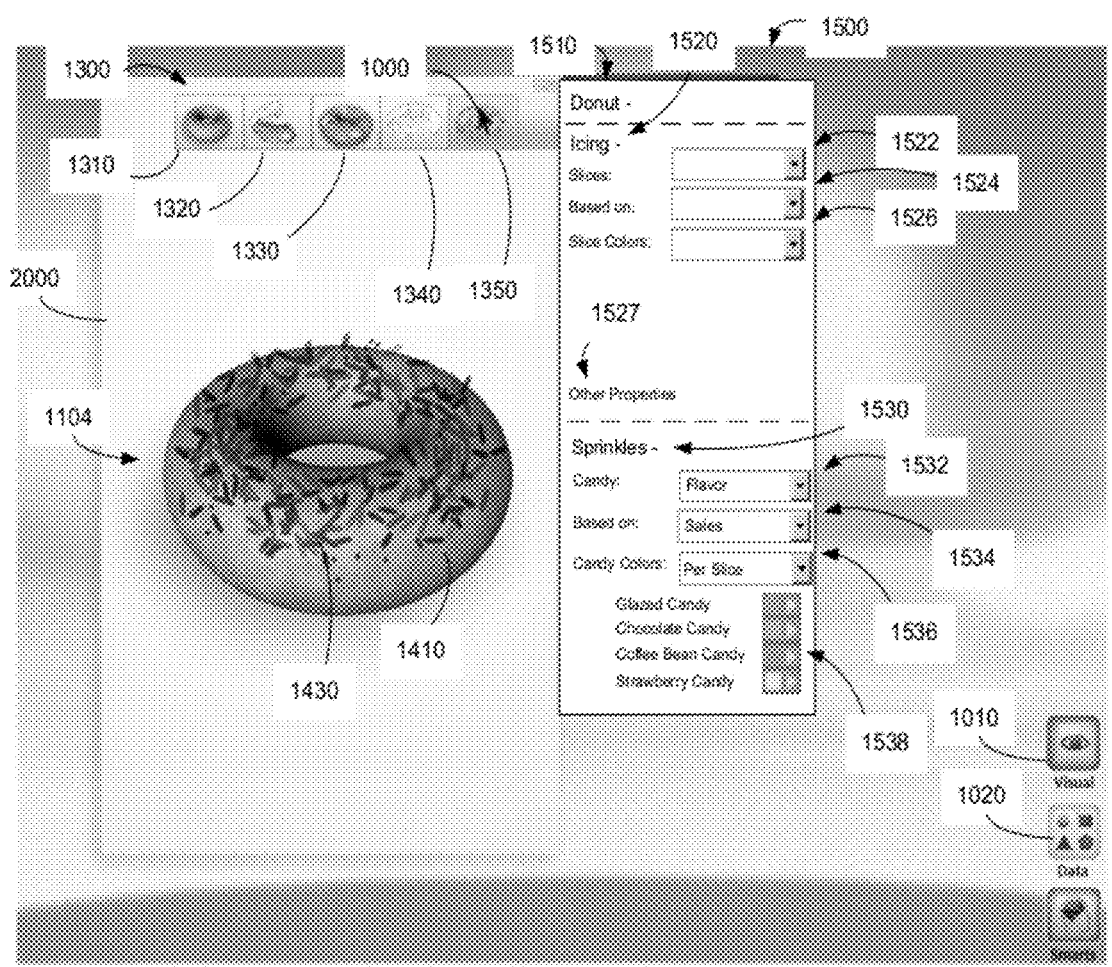
FIG. 8 is an illustration of the representative user interface of FIG. 7 in which further visual characteristics of the graphical object are presented.

While in FIG. 7, graphical donut 1102 is displayed on canvas 2000 via selection of proposed visualization 1340, though, FIG. 8 depicts the result of selecting proposed visualization 1350. Hence, selection of proposed visualization 1350 results in a graphical donut 1104 without icing, yet having sprinkles, displayed on the canvas 2000. In an embodiment, proposed visualization 1350 is selected by the user, resulting in the box representing proposed visualization 1350 to be darkened and the transformation of graphical donut 1102 to currently displayed graphical donut 1104. As illustrated in FIG. 8, graphical donut 1104 includes the donut dough 1410 with sprinkles 1430 disposed atop the base, yet without the icing illustrated.

With the selection of proposed visualization 1350, graphical modification tool 1500 depicts some variation from that illustrated in FIG. 7. The proposed visualization 1350 does not provide for icing to be displayed in graphical object 1104, and so regions associated with "Icing" adjustment box 1520 are left blank. However, various regions are still provided for viewing in the "Icing" adjustment box 1520, including a "Slices" region 1522, a "Based on" region 1524 and a "Slice Colors" region 1526.

As further shown in FIG. 8, the "Candy" region 1532 of the "Sprinkles" adjustment box 1530 is currently set by the user to "Flavor," that is, for the flavor of sprinkles 1430 of the graphical donut 1104 to be adjustable by the system. The "Based on" region 1534 is set by the user to "Sales," indicating sprinkles 1430 rendered by the system to represent general sales reported by the company. The "Candy Colors" region 1536 is set through user input for the colors of candy to be depicted by the system "Per slice." Color selection region 1538 is provided adjacent to the "Candy Colors" region 1536 to enable a user to choose what colors will correspond to which type of flavored sprinkles are rendered in the graphical donut 1104, such as for example, glazed candy, chocolate candy, coffee bean candy, or strawberry candy. In some embodiments, the appearance of a certain type of candy represents a sales event where a particular amount of revenue was collected. In an example not expressly illustrated or limited as such, glazed candy may represent sales events where more than 20 thousand in sales were accrued, chocolate candy may denote events where sales between 10 thousand and 20 thousand were collected, coffee bean candy may signify sales events of between 5 thousand and 10 thousand, and strawberry candy may represent sales events where less than 5 thousand in sales were collected.

As discussed above, prior to or after a data visualization has been rendered, various parameters of graphical objects and/or dimensions of a data set may be suitably adjusted, as desired. In some embodiments, visual characteristics of a graphical object may be appropriately changed to suit a preferred manner of data visualization. For example, visual characteristics of the graphical object may be resized according to certain ranges provided by the data set to be presented. Certain characteristics of the graphical object may be assigned to different colors, or transformed altogether, according to desired parameters for the data visualization. In some instances, visual characteristics may be subject to constraints where certain features of the appearance of a visual characteristic is limited by the constraints set on parameters of the visual characteristic, for example, based on the metadata associated with the graphical object. In an example, to reduce computational expense, a constraint on a visual characteristic to limit the representation of data values within a tolerance of 1% precision can be set.

In some cases, the data itself may be manipulated, resulting in alterations of visual characteristics in the graphical object. For example, when dimensions of data are added, removed and/or subject to filtering, the visualization of data through the graphical object may be appropriately modified according to how the data is adjusted.

In the example provided of the graphical donut, the toroidal shape of the donut provides for sales data to be displayed according to sales reported during certain periods of a fiscal year. Thus, while not being limited as such, the donut is partitioned into segments in accordance with sales reported at various points in the year. Alternatively, the ability for sprinkles to be scattered about any location on the surface of the donut can map to data that records the occurrence of certain sales occasions during the year. It should be understood that the above description provides only an exemplary embodiment of a data visual. Indeed, visual characteristics of a graphical object may have parameters to suit any desirable mapping of dimensions in a data set to the visual characteristics. In addition, a graphical object may be appropriate modified through a graphical manipulation tool to incorporate additional metadata that further defines how visual characteristics of the graphical object may display data visually.

While parameters of visual characteristics in a graphical object may be appropriately varied, dimensions of data and/or visual characteristics themselves may be subject to certain filters and/or constraints. When a filter or constraint is applied to the data visualization, a modified data visual is generated in accordance with the filter or constraint. For example, a parameter that specifies a broad range under which dimensions of data fall may provide for a visualization of a large number of dimensions of a data set. However, applying a filter that changes the parameter to a narrower range under which dimensions of data fall will result in a modified visualization of a smaller number of dimensions of data to be represented. Similarly, values of parameters that define the appearance of certain visual characteristics may be set according to one or more constraints. As a result, only certain values within a dimension of data may be displayed through the visual characteristics through which the constraint(s) are applied.

Figure 9:
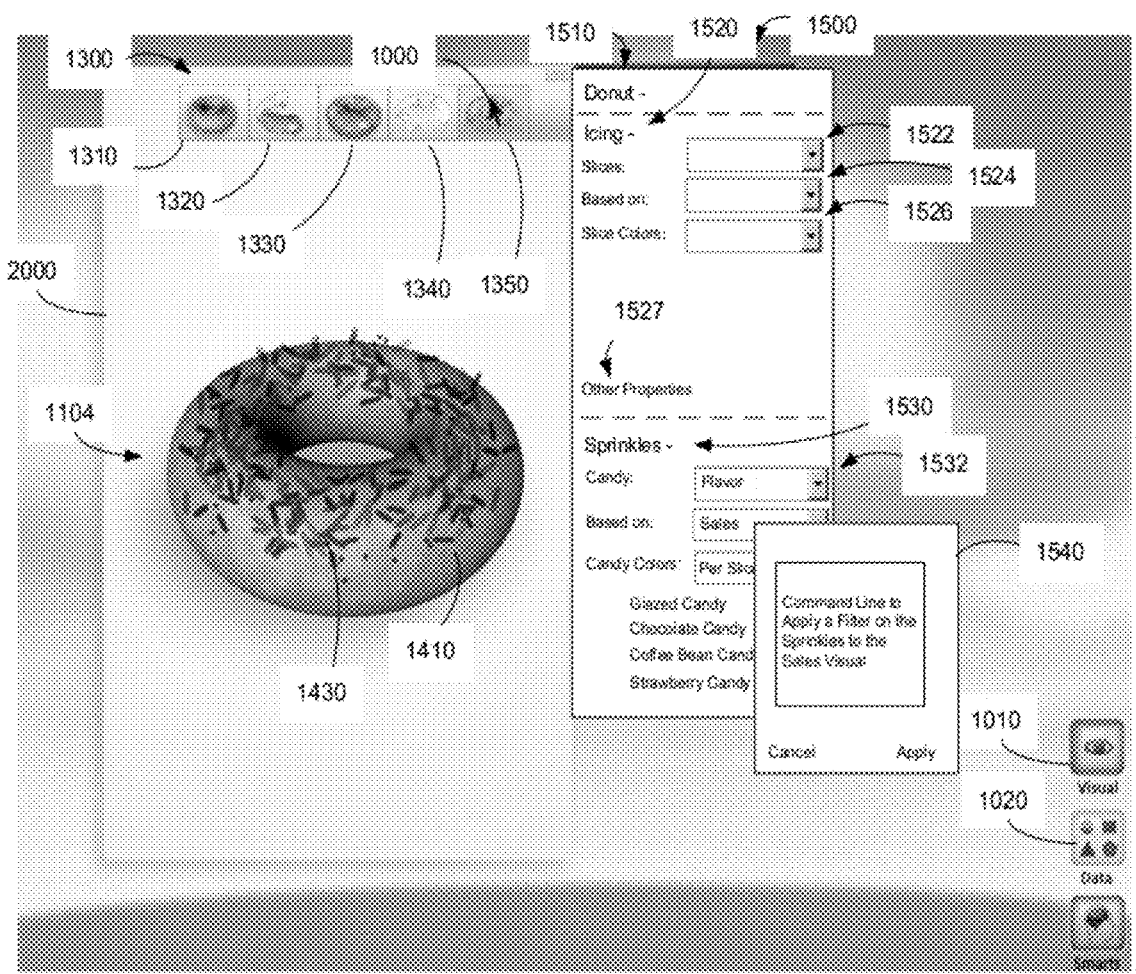
FIG. 9 is an illustration of the representative user interface of FIG. 8 where a filter applied to a dimension of the data set influences the appearance of a visual characteristic of the graphical object.
Figure 10:
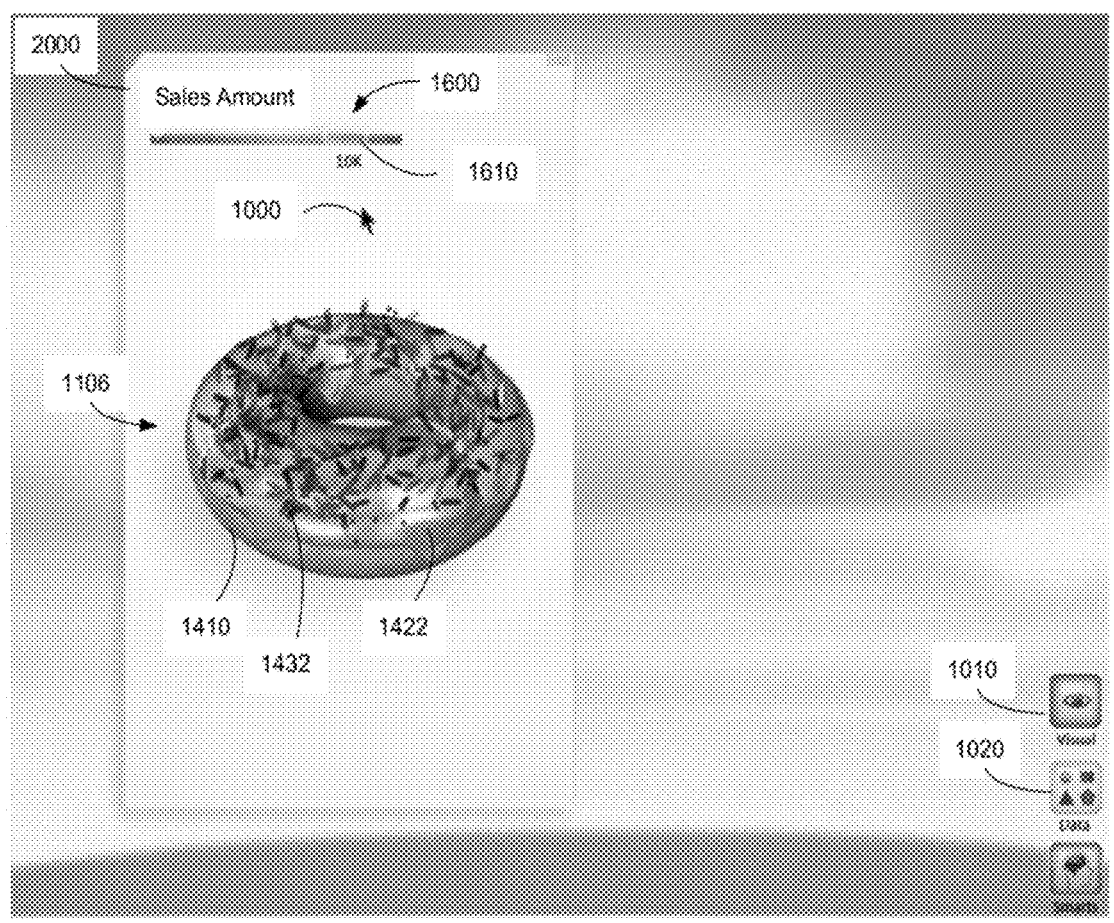
FIG. 10 is an illustration of a representative user interface in which the visual characteristic of the graphical object is subject to the filter.

In the above example of the graphical donut for visualizing sales data, FIG. 9 depicts a filter command box 1540 that provides the ability for an added filter to be applied to the data visualization. The filter command box 1540 applies a filter to the sprinkles 1430 of the sales data visualization. Once applied, FIG. 10 illustrates a graphical donut 1106 having a donut base 1410, icing 1422 and sprinkles 1432 where one or more visual characteristics are linked to the applied filter. In particular, the sprinkles 1432 are mapped to a set of data that is filtered according to setting a sliding scale 1600 that refers to sales recorded within a certain amount range. A highlighted range 1610 shown along sliding scale 1600 is provided as a filter for the data represented by the graphical donut. In this example, the number of sales events where the amount collected falls within the highlighted range 1610 is represented by the number of sprinkles on the graphical donut. As shown in FIG. 10, for graphical donut 1106, sales events where the amount collected was within a range of about $10,000+/−$1, 000 are represented as sprinkles 1432.

Figure 11:
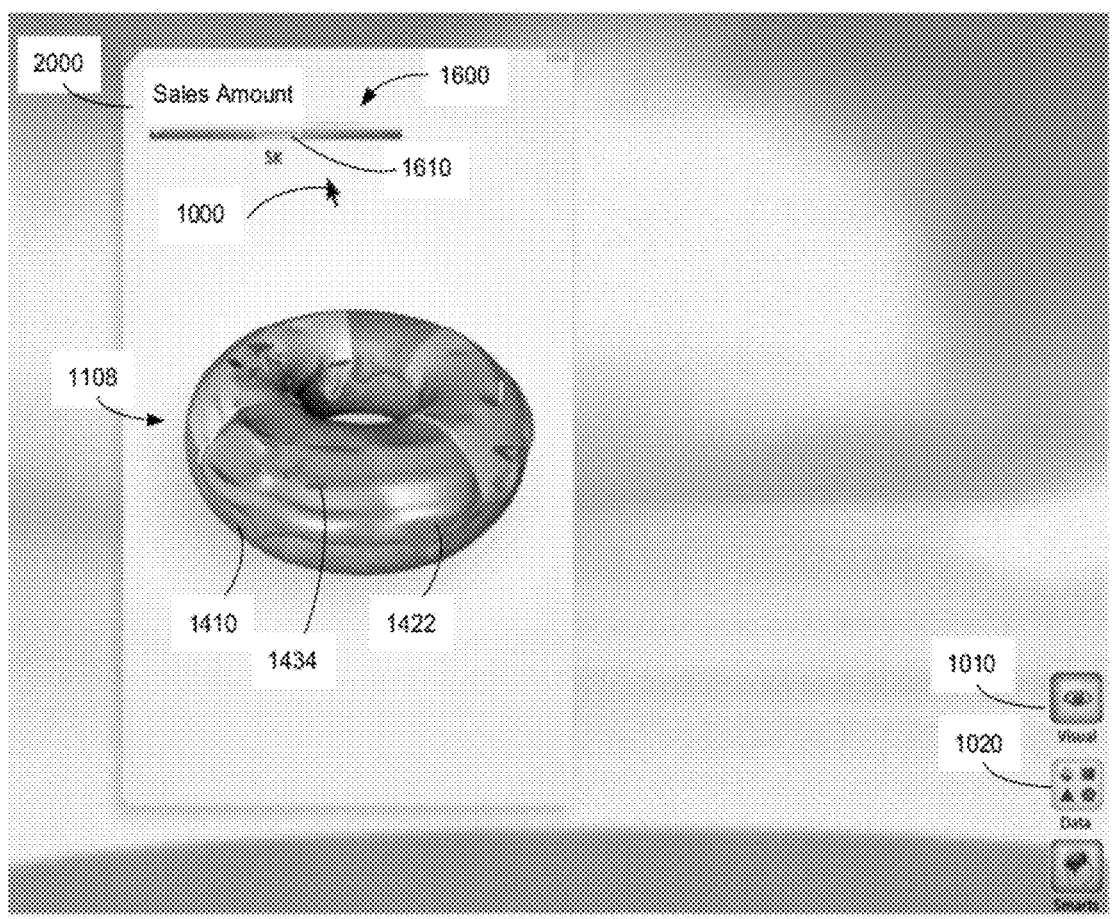
FIG. 11 is an illustration of the representative user interface of FIG. 10 in which the visual characteristic of the graphical object is subject to different parameters defined by the filter.

However, turning toward FIG. 11, the highlighted range 1610 that centered around $10,000 is moved to a range of about $5,000+/−$1,000. Accordingly, the graphical donut 1106 of FIG. 11 is transformed to the graphical donut 1108 of FIG. 11 where only sales events that qualify within the range of $5,000+/−$1,000 are displayed, as sprinkles 1434. As depicted, the amount of sprinkles 1434 shown is substantially less than the amount of sprinkles 1432, denoting that there were substantially more sales events with amounts collected in the $10,000+/−$1,000 range as compared with sales events with amounts collected in the $5,000+/−$1,000 range. It should be appreciated that depiction of applied filters shown in FIGS. 10 and 11 are provided by way of example and that any suitable set of filters or constraints can be applied to a data visualization the visualization may dynamically be adjusted through any appropriate user interface.

Figure 12:
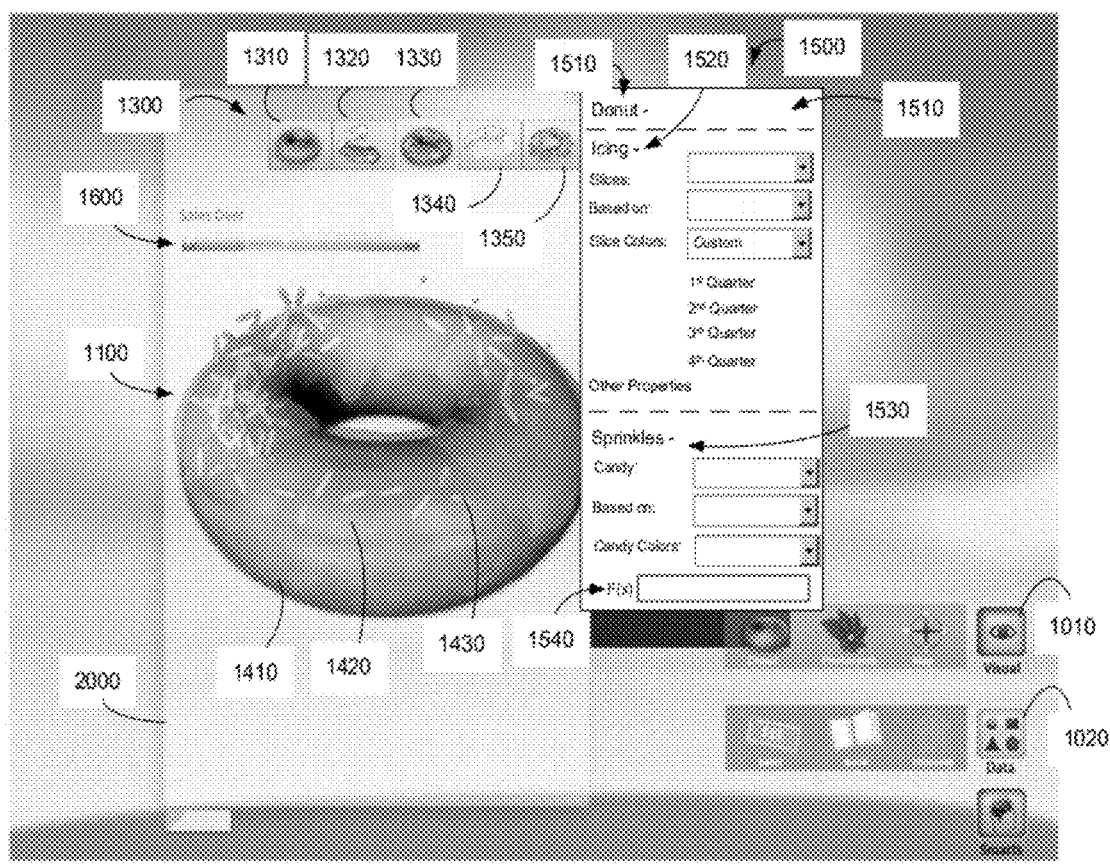
FIG. 12 is an illustration of an example of a general user interface for displaying data through a graphical object.

The user interface of FIG. 12 generally depicts each of the features described above with respect to data visualization through the graphical donut. A graphical object may be chosen via selection of "Visual" icon 1010; and a data set may be chosen to be presented through the graphical object through selection of "Data" icon 1020. Canvas 2000 may display the graphical object 1100, a number of proposed visualizations 1300 as well as filters or constraints 1600 that the visual characteristics of the graphical object 1100 and/or the data itself may be subject to. Further, graphical manipulation tool 1500 may provide for parameters of visual characteristics of the graphical object to be modified as desired.

As discussed above, metadata may be associated to visual characteristics of graphical objects to define parameters through which data may be bound to the visual characteristics. Such metadata provide information for how binding or mapping of dimensions of data to visual characteristics may occur. For example, the parameters that define how visual characteristics may receive data to be represented through the visual characteristics may include metadata that inform how the visual characteristics may be adjusted or changed (e.g., transformed, scaled, re-shaped, colored, etc.).

In the example above, to display how much revenue was collected during a certain quarter, the color of icing would identify the particular quarter of interest and the volume of icing would represent the amount of revenue collected for that quarter. In an inverse example, for visualizing the same information, a different set of parameters could be defined, such as the color of the icing to represent the amount of revenue collected for that quarter and the volume and location of icing specifying the particular quarter of interest. It can be appreciated that visual characteristics of graphical objects may be adjusted in accordance with any suitable parameters so as to accurately and effectively represent the data.

The metadata that defines how data may be bound to visual characteristics may provide constraints as to what degree the visual characteristic(s) may be manipulated. That is, there may be aesthetic or proportional aspects of visual characteristics of the graphical object that limit certain dimensions of data from being displayed. Indeed, for some embodiments, certain data structures may be outside the scope of what a graphical object may be able to represent.

Further, metadata may be associated with the data set itself to define parameters that describe how dimensions of data may map to certain graphical objects. For example, different data sets may have intrinsic differences. In an embodiment, a data set may be represented as a continuous variation, such as through a gradient depicted through a visual characteristic. Alternatively, a data set may be displayed as a set of enumerable discrete values through, for example, discrete features of a visual characteristic. Metadata may indicate whether the data set includes a particular range of data values, or for example, geometric implications such as locations, structural features and/or coordinates. Metadata may describe dimensions of data having relationships within sets, for example, a listing of peer values or alternatives. In some cases, certain dimensions of data in a data set may be discarded as outliers, and not included in the visualization of the data set. Dimensions of data may also be described by metadata as to whether the data is sampleable, quantizable and/or smoothable in nature. As discussed above, a system may analyze a graphical object through a graphical manipulation tool and propose metadata for incorporation into the graphical object, making the graphical object more suitable for representing data.

A system that produces a visualization of dimensions of data by mapping the dimensions of data to an independently created graphical object may generate the data visual through any series of steps. In an embodiment for generating the data visual, a system analyzes the metadata and/or parameters associated with visual characteristics of the graphical object. The system also analyzes metadata and/or parameters intrinsic to the data set itself. The system then identifies certain visual characteristics of the graphical object and the ability for certain types and dimensions of data map to one or more visual characteristics. Schemes for transforming dimensions of the data set to suit the process of mapping the visual characteristics to the dimensions of data are also ascertained.

Further, a number of proposed visualizations for binding dimensions of data in the data set to visual characteristics of the graphical object may be presented. Accordingly, a user may select which of the proposed visualizations of the data is preferred to suit the user's interests (e.g., understanding the data better, presenting to the data to a group, etc.).

Additionally, and as described above, parameters of the visual characteristics as well as the dimensions of data may be appropriately manipulated, as desired, to yield modified data visualizations.

Having thus described several aspects of at least one embodiment of this invention, it is to be appreciated that alterations, modifications, and improvements are intended to be part of this disclosure, and are intended to be within the spirit and scope of the invention. Accordingly, the foregoing description and drawings are by way of example only.

The above-described embodiments of the present invention can be implemented in any of numerous ways. For example, the embodiments may be implemented using hardware, software or a combination thereof. When implemented in software, the software code can be executed on any suitable processor or collection of processors, whether provided in a single computer or distributed among multiple computers.

Further, it should be appreciated that a computer may be embodied in any of a number of forms, such as a rack-mounted computer, a desktop computer, a laptop computer, or a tablet computer. Additionally, a computer may be embedded in a device not generally regarded as a computer but with suitable processing capabilities, including a Personal Digital Assistant (PDA), a smart phone or any other suitable portable or fixed electronic device.

Also, a computer may have one or more input and output devices. These devices can be used, among other things, to present a user interface. Examples of output devices that can be used to provide a user interface include printers or display screens for visual presentation of output and speakers or other sound generating devices for audible presentation of output. Examples of input devices that can be used for a user interface include keyboards, and pointing devices, such as mice, touch pads, digitizing tablets, and touch-responsive display screen, such as direct-interaction displays, multi-touch displays that respond to two or more fingers on the screen at the same time. As another example, a computer may receive input information through speech recognition or in other audible format.

Such computers may be interconnected by one or more networks in any suitable form, including as a local area network or a wide area network, such as an enterprise network or the Internet. Such networks may be based on any suitable technology and may operate according to any suitable protocol and may include wireless networks, wired networks or fiber optic networks.

Also, the various methods or processes outlined herein may be coded as software that is executable on one or more processors that employ any one of a variety of operating systems or platforms. Additionally, such software may be written using any of a number of suitable programming languages and/or programming or scripting tools, and also may be compiled as executable machine language code or intermediate code that is executed on a framework or virtual machine.

In this respect, the invention may be embodied as a computer-readable medium (or multiple computer readable media) (e.g., a computer memory, one or more floppy discs, compact discs (CD), optical discs, digital video disks (DVD), magnetic tapes, flash memories, circuit configurations in Field Programmable Gate Arrays or other semiconductor devices, or other non-transitory, tangible computer storage medium) encoded with one or more programs that, when executed on one or more computers or other processors, perform methods that implement the various embodiments of the invention discussed above. The computer-readable medium or media can be transportable, such that the program or programs stored thereon can be loaded onto one or more different computers or other processors to implement various aspects of the present invention as discussed above.

The terms "program" or "software" are used herein in a generic sense to refer to any type of computer code or set of computer-executable instructions that can be employed to program a computer or other processor to implement various aspects of the present invention as discussed above. Additionally, it should be appreciated that according to one aspect of this embodiment, one or more computer programs that, when executed, perform methods of the present invention need not reside on a single computer or processor, but may be distributed in a modular fashion amongst a number of different computers or processors to implement various aspects of the present invention.

Computer-executable instructions may be in many forms, such as program modules, executed by one or more computers or other devices. Generally, program modules include routines, programs, objects, components, data structures, etc. that perform particular tasks or implement particular abstract data types. Typically, the functionality of the program modules may be combined or distributed as desired in various embodiments.

Also, data structures may be stored in computer-readable media in any suitable form. For simplicity of illustration, data structures may be shown to have fields that are related through location in the data structure. Such relationships may likewise be achieved by assigning storage for the fields with locations in a computer-readable medium that conveys relationship between the fields. However, any suitable mechanism may be used to establish a relationship between information in fields of a data structure, including through the use of pointers, tags or other mechanisms that establish relationship between data elements.

Various aspects of the present invention may be used alone, in combination, or in a variety of arrangements not specifically discussed in the embodiments described in the foregoing and is therefore not limited in its application to the details and arrangement of components set forth in the foregoing description or illustrated in the drawings. For example, aspects described in one embodiment may be combined in any manner with aspects described in other embodiments.

Also, the invention may be embodied as a method, of which an example has been provided. The acts performed as part of the method may be ordered in any suitable way. Accordingly, embodiments may be constructed in which acts are performed in an order different than illustrated, which may include performing some acts simultaneously, even though shown as sequential acts in illustrative embodiments.

Use of ordinal terms such as "first," "second," "third," etc., in the claims to modify a claim element does not by itself connote any priority, precedence, or order of one claim element over another or the temporal order in which acts of a method are performed, but are used merely as labels to distinguish one claim element having a certain name from another element having a same name (but for use of the ordinal term) to distinguish the claim elements.

Also, the phraseology and terminology used herein is for the purpose of description and should not be regarded as limiting. The use of "including," "comprising," or "having," "containing," "involving," and variations thereof herein, is meant to encompass the dimensions listed thereafter and equivalents thereof as well as additional dimensions.

The invention claimed is:

1. A method of operating a computing device for processing a graphical object having at least one visual characteristic, the method comprising:
with at least one processor:
obtaining access to a data set;
receiving a selection of the graphical object, selected from a plurality of available graphical objects that are different from one another, that have graphical object characteristics that are suitable for representing determined dimensions of the data set, and that include the graphical object;
analyzing, by a software tool, via the at least one processor, without user input to the analyzing by the software tool, the graphical object to determine one or more parameters of the at least one visual characteristic that can be varied to visually represent data with the graphical object; and
storing, in association with a representation of the graphical object, metadata that defines a capacity of the at least one visual characteristic to represent data.

2. The method of claim 1, wherein:
the one or more parameters of the at least one visual characteristic comprises a parameter representing color; and
the metadata that defines the capacity of the at least one visual characteristic includes a number of colors representable by varying the parameter representing color.

3. The method of claim 1, wherein:
the one or more parameters of the at least one visual characteristic comprises a parameter representing a size of an element; and
the metadata that defines the capacity of the at least one visual characteristic defines a range of sizes representable by varying the parameter representing the size of the element.

4. The method of claim 1, wherein:
the one or more parameters of the at least one visual characteristic comprises a parameter representing a number of repetitions of an element in the graphical object; and
the metadata that defines the capacity of the at least one visual characteristic defines a maximum number of repetitions of the element representable in the graphical object.

5. The method of claim 4, wherein the one or more parameters of the number of repetitions comprises a parameter representing a layout of an arrangement of the repetitions of the element.

6. The method of claim 1, wherein:
the one or more parameters of the at least one visual characteristic comprises a parameter representing a number of sub-divisions of an element in the graphical object; and
the metadata that defines the capacity of the at least one visual characteristic defines a maximum number of sub-divisions of the element representable in the graphical object.

7. The method of claim 6, wherein the one or more parameters of the number of sub-divisions comprises a parameter representing a layout of an arrangement of the sub-divisions of the element.

8. The method of claim 1, wherein:
the one or more parameters of the at least one visual characteristic comprises a parameter representing an ability of an element for animation in the graphical object; and
the metadata that defines the capacity of the at least one visual characteristic includes at least one pattern of movement representable by varying the parameter representing the ability of an element for animation.

9. The method of claim 1, wherein:
analyzing the graphical object comprises statistical pattern matching.

10. The method of claim 1, further comprising:
generating additional metadata representing an additional capacity of the at least one visual characteristic to represent data for incorporation with the graphical object.

11. The method of claim 10, further comprising:
proposing the additional metadata representing an additional capacity of the at least one visual characteristic to represent data.

12. The method of claim 11, wherein:
proposing the additional metadata representing an additional capacity of the at least one visual characteristic to represent data comprises displaying a preview presented on the user interface of the additional capacity of the at least one visual characteristic to represent data.

13. The method of claim 10, wherein:
generating additional metadata representing an additional capacity of the at least one visual characteristic to represent data comprises receiving input through a user interface of the additional capacity of the at least one visual characteristic to represent data or automatically generating the additional metadata.

14. The method of claim 1, wherein:
the at least one visual characteristic of the graphical object includes at least one of a color intensity, one or more segments, one or more layers, or one or more boundaries that map to a dimension of a data set.

15. At least one hardware computer-readable computer storage medium comprising computer-executable instructions that, when executed by at least one processor, perform a method for processing a graphical object having a visual characteristic for data visualization, the method comprising:
analyzing the graphical object to determine one or more parameters of the visual characteristic that can be varied to visually represent data with the graphical object, the analyzing to determine including analyzing the graphical object to determine at least one of the one or more parameters without user input to the analyzing to determine the at least one of the one or more parameters;
storing, in association with a representation of the graphical object, metadata that defines a capacity of the visual characteristic to represent data;
generating additional metadata representing an additional capacity of the visual characteristic to represent data for incorporation with the graphical object; and
receiving input to incorporate the additional metadata with the graphical object through a user interface.

16. The computer-readable storage medium of claim 15, wherein:
the one or more parameters of the visual characteristic comprises a parameter representing color; and
the metadata that defines the capacity of the visual characteristic indicates a number of colors representable by varying the parameter representing color.

17. The computer-readable storage medium of claim 15, wherein:
the one or more parameters of the visual characteristic comprises a parameter representing a size of an element; and
the metadata that defines the capacity of the visual characteristic defines a range of sizes representable by varying the parameter representing the size of the element.

18. The computer-readable storage medium of claim 15, wherein:
the one or more parameters of the visual characteristic comprises a parameter representing a number of repetitions or sub-divisions of an element in the graphical object; and
the metadata that defines the capacity of the visual characteristic defines a maximum number of repetitions or sub-divisions of the element representable in the graphical object.

19. The computer-readable storage medium of claim 15, wherein:
the one or more parameters of the visual characteristic comprises a parameter representing an animation ability of an element in the graphical object; and
the metadata that defines the capacity of the visual characteristic includes at least one pattern of movement representable by varying the parameter representing the animation ability of the element.

20. At least one hardware computer-readable computer storage medium comprising computer-executable instructions that, when executed by at least one processor, perform a method for processing a graphical object having a plurality of visual characteristics for data visualization, the method comprising:
creating, with a graphical manipulation tool, the graphical object;
analyzing the graphical object to determine one or more parameters of the plurality of visual characteristics that can be varied to visually represent data with the graphical object, the analyzing to determine including analyzing the graphical object to determine at least one of the one or more parameters without user input to the analyzing to determine the at least one of the one or more parameters;
storing, in association with a representation of the graphical object, metadata defining a capacity of one or more of the plurality of visual characteristics to represent data;
generating additional metadata representing an additional capacity of the plurality of visual characteristics to represent data for incorporation with the graphical object;
displaying a preview of the additional metadata representing an additional capacity of the at least one visual characteristic to represent data on a user interface; and
receiving input to incorporate the additional metadata with the graphical object through the user interface.

* * * * *